United States Patent
Xi et al.

(10) Patent No.: US 8,879,397 B2
(45) Date of Patent: Nov. 4, 2014

(54) BALANCING LOAD IN A NETWORK, SUCH AS A DATA CENTER NETWORK, USING FLOW BASED ROUTING

(75) Inventors: Kang Xi, Morganville, NJ (US); H. Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 325 days.

(21) Appl. No.: 13/107,721

(22) Filed: May 13, 2011

(65) Prior Publication Data

US 2012/0287791 A1   Nov. 15, 2012

(51) Int. Cl.
*H04L 12/803* (2013.01)
*H04L 12/26* (2006.01)
*H04L 12/721* (2013.01)
*H04L 12/707* (2013.01)
*H04L 29/12* (2006.01)

(52) U.S. Cl.
CPC ............ *H04L 43/0882* (2013.01); *H04L 45/38* (2013.01); *H04L 47/125* (2013.01); *H04L 43/10* (2013.01); *H04L 45/22* (2013.01); *H04L 61/2517* (2013.01); *H04L 45/26* (2013.01)
USPC ........................................................ 370/237

(58) Field of Classification Search
USPC .................. 370/235–237, 242, 389
See application file for complete search history.

(56) References Cited

U.S. PATENT DOCUMENTS 7,633,939 B2 * 12/2009 Curran-Gray et al. ........ 370/389
7,788,407 B1 * 8/2010 Venkat et al. .................. 709/245
2011/0261811 A1 * 10/2011 Battestilli et al. ............. 370/389
2012/0063314 A1 * 3/2012 Pignataro et al. ............. 370/235
2012/0106358 A1 * 5/2012 Mishra et al. ................. 370/242

OTHER PUBLICATIONS

M. Al-Fares, S. Radhakrishnan, B. Raghavan, N. Huang, and A. Vahdat, "Hedera: Dynamic Flow Scheduling for Data Center Networks," *Proc. of Networked Systems Design and Implementation (NSDI) Symposium*, (2010).

B. Augustin, X. Cuvellier, B. Orgogozo, F. Viger, T. Friedman, M. Latapy, C. Magnien, and R. Teixeira, "Avoiding Traceroute Anomalies With Paris Traceroute," *IMC*, (2006).

B. Claise, "Cisco Systems NetFlow Services Export Version 9," *RFC 3954 (Informational)*, (Oct. 2004).

K. Egevang and P. Francis, "The IP Network Address Translator (NAT)," *RFC 1631 (Informational)*, (May 1994) (Obsoleted by RFC 3022).

(Continued)

*Primary Examiner* — Hoon J Chung
*Assistant Examiner* — Yaotang Wang
(74) *Attorney, Agent, or Firm* — John C. Pokotylo; Straub & Pokotylo

(57) ABSTRACT

Load balancing is performed in a network using flow-based routing. For example, upon detection of a big flow, one or more alternative paths from a source host to a destination host in the network may be discovered by probing the network and generating, for each of the one or more alternative paths, an association of the packet header information of the big flow to an alternative path discovered using results of probing the network. Upon congestion in a path currently being used by the big flow, an alternative path that is not congested is selected from the one or more discovered alternative paths. The packet header information of the big flow is altered using the generated association of the packet header information to the selected alternative path such that the big flow will be transmitted using the selected alternative path.

20 Claims, 13 Drawing Sheets

(56) References Cited

OTHER PUBLICATIONS

A. Greenberg, J. R. Hamilton, N. Jain, S. Kandula, C. Kim, P. Lahiri, D. A. Maltz, P. Patel, and S. Sengupta, "VL2: A Scalable and Flexible Data Center Network," *SIGCOMM '09: Proceedings of the ACM SIGCOMM Conference on Data Communication*, New York, NY, pp. 51-62, (2009).

C. Guo, G. Lu, D. Li, H. Wu, X. Zhang, Y. Shi, C. Tian, Y. Zhang, and S. Lu., "BCube: A High Performance, Server-Centric Network Architecture for Modular Data Centers," *SIGCOMM '09: Proceedings of the ACM SIGCOMM 2009 Conference on Data Communication*, pp. 63-74, New York, NY, USA, (2009).

C. Guo, H. Wu, K. Tan, L. Shi, Y. Zhang, and S. Lu. "DCell: A Scalable and Fault-Tolerant Network Structure for Data Centers," *SIGCOMM '08: Proceedings of the ACM SIGCOMM 2008 Conference on Data Communication*, pp. 75-86, New York, NY, USA, (2008).

C. Hopps, "Analysis of an Equal-Cost Multi-Path Algorithm," *RFC 2992 (Informational)*, (Nov. 2000).

S. Kandula, S. Sengupta, A. Greenberg, P. Patel, and R. Chaiken, "The Nature of Data Center Traffic: Measurements & Analysis," *Proceedings of the 9th ACM SIGCOMM Conference on Internet Measurement Conference, IMC '09*, pp. 202-208, New York, NY, USA, (2009).

Y. Liao, D. Yin, and L. Gao, "DPillar: Scalable Dual-Port Server Interconnection for Data Center Networks," *IEEE ICCCN*, (2010).

G. Malkin, "Traceroute Using an IP Option," *RFC 1393 (Experimental)*, (Jan. 1993).

N. McKeown, T. Anderson, H. Balakrishnan, G. Parulkar, L. Peterson, J. Rexford, S. Shenker, and J. Turner, "OpenFlow: Enabling Innovation in Campus Networks," *SIGCOMM Comput. Commun. Rev.*, 38(2):69-74, (2008).

J. Moy, "OSPF Version 2," *RFC 2328 (Standard)*, (Apr. 1998).

R. Niranjan Mysore, A. Pamboris, N. Farrington, N. Huang, P. Miri, S. Radhakrishnan, V. Subramanya, and A. Vahdat, "PortLand: A Scalabale Fault-Tolerant Layer 2 Data Center Network Fabric," *SIGCOMM '09: Proceedings of The ACM SIGCOMM 2009 Conference on Data Communication*, pp. 39-50, New York, NY, USA, (2009).

P. Phaal, S. Panchen, and N. McKee, "Mon Corporation's sFlow: A Method for Monitoring Traffic in Switched and Routed Networks," *RFC 3176 (Informational)*, (Sep. 2001).

M. C. Toren, "tcptraceroute," http://michael.toren.net/code/tcptraceroute, (Mar. 2006) (Accessed May 2011).

\* cited by examiner

BALANCING LOAD IN A NETWORK, SUCH AS A DATA CENTER NETWORK, USING FLOW BASED ROUTING

1. BACKGROUND OF THE INVENTION

1.1 Field of the Invention

The present invention concerns load balancing in a network, using flow based routing such as a data center network.

1.2 Background Information

The purpose of load balancing in communication networks is to route traffic across multiple paths in an effective way so that the load on the network links and/or nodes are evenly distributed. In practice, to design and evaluate load balancing, the links are considered. Typically, routing in an autonomous system is based on shortest path algorithms, e.g., open shortest path first. (See, e.g., J. Moy, "OSPF Version 2," *RFC* 2328 (*Standard*), (April 1998), incorporated herein by reference.). Without load balancing over multiple paths, the shortest path from a source to a destination is calculated in advance, and all the traffic from the source to the destination is directed through this shortest path.

Data center networks often use densely interconnected topologies to provide large bandwidth for internal data exchange. In such networks, effective load balancing schemes are employed to use the bandwidth resources fully. For example, fat-tree and Clos networks are widely adopted where a large number of paths exist between each pair of nodes. (See, e.g., A. Greenberg, J. R. Hamilton, N. Jain, S. Kandula, C. Kim, P. Lahiri, D. A. Maltz, P. Patel, and S. Sengupta, "VL2: A Scalable And Flexible Data Center Network," *SIGCOMM '09: Proceedings of the ACM SIGCOMM Conference on Data Communication*, New York, N.Y., pages 51-62, (2009); and R. Niranjan Mysore, A. Pamboris, N. Farrington, N. Huang, P. Miri, S. Radhakrishnan, V. Subramanya, and A. Vandat. PortLand, "A Scalable Fault-Tolerant Layer 2 Data Center Network Fabric," *SIGCOMM '09: Proceedings of The ACM SIGCOMM 2009 Conference on Data Communication*, pages 39-50, New York, N.Y., USA, (2009), both incorporated herein by reference.) The proposed data center network topologies including DCell (See, e.g., C. Guo, H. Wu, K. Tan, L. Shi, Y. Zhang, and S. Lu. "DCell: A Scalable And Fault-Tolerant Network Structure For Data Centers," *SIGCOMM '08: Proceedings of the ACM SIGCOMM 2008 Conference on Data Communication*, pages 75-86, New York, N.Y., USA, (2008), incorporated herein by reference.), BCube (See, e.g., C. Guo, G. Lu, D. Li, H. Wu, X. Zhang, Y. Shi, C. Tian, Y. Zhang, and S. Lu., "BCube: A High Performance, Server-Centric Network Architecture For Modular Data Centers," *SIGCOMM '09: Proceedings Of The ACM SIGCOMM 2009 Conference On Data Communication*, pages 63-74, New York, N.Y., USA, (2009), incorporated herein by reference.), and DPillar (See e.g., Y. Liao, D. Yin, and L. Gao, "DPillar: Scalable Dual-Port Server Interconnection for Data Center Networks," *IEEE ICCCN*, (2010), incorporated herein by reference.), all feature of dense interconnections. In these types of networks, using single-path routing without load balancing cannot utilize the network capacity fully. As a result, network congestion may occur even if the network has abundant unused bandwidth.

The foregoing problem is illustrated referring to FIG. 1. If two shortest paths A-E-F-D and G-E-F-J are selected for single-path routing between source host 110 and destination host 115, link E-F may be overloaded even if paths A-B-C-D and G-H-I-J have unused bandwidth. This problem may be alleviated using equal-cost multi-path (ECMP) routing. (See, for e.g., C. Hopps, "Analysis of An Equal-Cost Multi-Path Algorithm," *RFC* 2992 (*Informational*), (November 2000), incorporated herein by reference.) With ECMP, multiple shortest paths are calculated from a source to a destination, and traffic is distributed across these equal-cost paths to achieve load balancing. In FIG. 1, if both A-E-F-D and A-B-C-D are used to carry traffic from A to D, and both G-E-F-J and G-H-I-J are used to carry traffic from G to J, network utilization may be greatly improved. With ECMP, each router may have multiple output ports, which lead to multiple paths, for the same destination prefix. More specifically, when a packet arrives, the router calculates a hash value based on the packet header and selects one of the feasible output ports based on the hash value. It is typically a common practice to use the 5-tuple header fields (that is, source Internet Protocol (IP) address, destination IP address, protocol type, source port, and a destination port) to calculate the hash value. With this approach, packets belonging to the same flow follow the same path, thus avoiding out-of-sequence delivery. However, using ECMP cannot guarantee good load balancing for at least two reasons.

First, hash based traffic distribution is per-flow based, not per-packet based. Thus, the result is to balance the number of flows on different paths, but this does not necessarily balance the bit rates. More specifically, even if two paths carry the same number of flows, the traffic loads may not be equal since the flows have different bit rates. (See, e.g., M. Al-fares, S. Radhakrishnan, B. Raghavan, N. Huang, and A. Vandat, "Hedera: Dynamic Flow Scheduling for Data Center Networks," *Proc. of Networked Systems Design and Implementation (NSDI) Symposium*, (2010), incorporated herein by reference.) Second, from the network-wide viewpoint, using ECMP may still lead to overload on certain links. Referring back to FIG. 1, if A-D and G-J evenly each distribute their traffic between the two paths mentioned, the load on link E-F would still be twice of the load on any other links.

One may consider adjusting the hash function in a sophisticated way to achieve network wide load balancing. Unfortunately, this may not be feasible because the traffic fluctuates all the time and route recalculation occurs each time there is a topology change. Therefore, tuning hash functions may barely follow such dynamic changes, even if the considerable complexity could be handled.

A common approach to solve the problems of ECMP is flow-based routing. OpenFlow (See, e.g., N. McKeown, T. Anderson, H. Balakrishnan, G. Parulkar, L. Peterson, J. Rexford, S. Shenker, and J. Turner, "OpenFlow: Enabling Innovation in Campus Networks," *SIGCOMM Comput. Commun. Rev.*, 38(2): 69-74, (2008), incorporated herein by reference.) defines a framework in which switches and routers maintain flow tables and perform per-flow routing. Such flow tables may be dynamically modified from a remote station. Hedera (See. e.g., M. Al-fares, S. Radhakrishnan, B. Raghavan, N. Huang, and A. Vandat, "Hedera: Dynamic Flow Scheduling for Data Center Networks," *Proc. of Networked Systems Design and Implementation (NSDI) Symposium*, (2010), incorporated herein by reference.) shows how to use OpenFlow in data center networks to achieve load balancing. However, OpenFlow is not supported by existing commodity switches and routers, and the flow table configuration and maintenance are non-trivial.

In view of the foregoing, it would be useful to provide a scheme that enables one or more of (i) per-flow reroute without requiring any modifications to IP switches and/or routers (ii) a flow-based routing without requiring flow tables in the routers and/or switches, and (iii) easy deployment in existing data center networks to achieve effective load balancing.

2. SUMMARY OF THE INVENTION

Exemplary embodiments consistent with the present invention provide a method and apparatus for load balancing in a network using flow-based routing. More specifically, such embodiments may do so by (i) detecting a flow of packets, (ii) identifying the detected flow as a big flow, the big flow having packet header information identifying a source host and a destination host of the big flow, (iii) probing, responsive to detection of the big flow, the network by altering the packet header information to discover one or more alternative paths from the source host to the destination host in the network, (iv) generating, for each of the one or more alternative paths, an association of the packet header information to an alternative path discovered using results of probing the network and identified by at least one of an alternative source port and an alternative destination port, (v) determining if congestion exists on a path currently being used by the big flow in the network, (vi) selecting, responsive to a determination of the existence of congestion on the path currently being used, an alternative path that is from the one or more alternative paths and that is not congested, and (vii) altering the packet header information of the big flow using the generated association of the packet header information to the selected alternative path such that the big flow will be transmitted from the source host to the destination host using the selected alternative path.

In at least some exemplary embodiments consistent with the present invention, each of the altered packet header information associated with each of the one or more alternative paths differs from the packet header information in at least one of a source port number and a destination port number.

In at least some exemplary embodiments consistent with the present invention, probing the network includes: (i) creating one or more probe packets, wherein each of the one or more probe packets has header information similar to the packet header information by (a) setting values of a source Internet Protocol (IP) address, a destination IP address, and a protocol field in the header information of each of the one or more probe packets to values of corresponding fields in the packet header information, and (b) setting at least one of a source port number and a destination port number in the header information of each of the one or more probe packets to a port number that is different from the corresponding port number in the packet header information, (ii) setting values of a time-to-live field in each of the one or more probe packets such that the probe packets will be sent into the network at different points along an alternative path, (iii) transmitting the one or more probe packets in the network, (iv) receiving the result of each of the one or more probe packets, wherein the results collectively indicate a path taken by the one or more probe packets from the source host towards the destination host, and (v) reconstructing an alternative path from the source host to the destination host using the result of each of the one or more probe packets.

In at least some exemplary embodiments consistent with the present invention, each of the one or more associations of the packet header information to an alternative path is generated by associating at least one of a source port number and a destination port number of the packet header information to at least one of a source port number and a destination port number corresponding to the alternative path.

In at least some exemplary embodiments consistent with the present invention, altering the packet header information using the generated association includes altering a value of at least one of a source port number and a destination port number in the packet header information to a value of corresponding fields of the selected alternative path.

In at least some exemplary embodiments consistent with the present invention, the big flow is transmitted to the destination host using an equal cost multi path (ECMP) routing protocol.

In at least some exemplary embodiments consistent with the present invention, flow-based routing is performed by (i) detecting a flow of packets, (ii) identifying the detected flow as a big flow, the big flow having packet header information identifying a source host and a destination host of the big flow, (iii) probing, responsive to detection of the big flow, the network by altering the packet header information to discover one or more alternative paths from the source host to the destination host in the network, (iv) generating, for each of the one or more alternative paths, an association of the packet header information to an alternative path using results of probing the network and identified by at least one of an alternative source port and an alternative destination port, (v) notifying to a controller in the network that is monitoring traffic in the network, the big flow and the one or more alternative paths, (vi) determining, with the controller, that congestion exists on a path currently being used by the big flow in the network, (vii) selecting, with the controller and responsive to a determination of the existence of congestion on the path currently being used by the big flow, an alternative path from the one or more alternative paths that is not congested, (viii) sending, with the controller, a re-route notification including a path identification of the selected alternative path to the source host, and (ix) altering, upon a receipt of the re-route notification, the packet header information of the big flow using the generated association such that the big flow will be transmitted from the source host to the destination host using the selected alternative path.

3. BRIEF DESCRIPTION OF THE DRAWINGS

Figure 6:
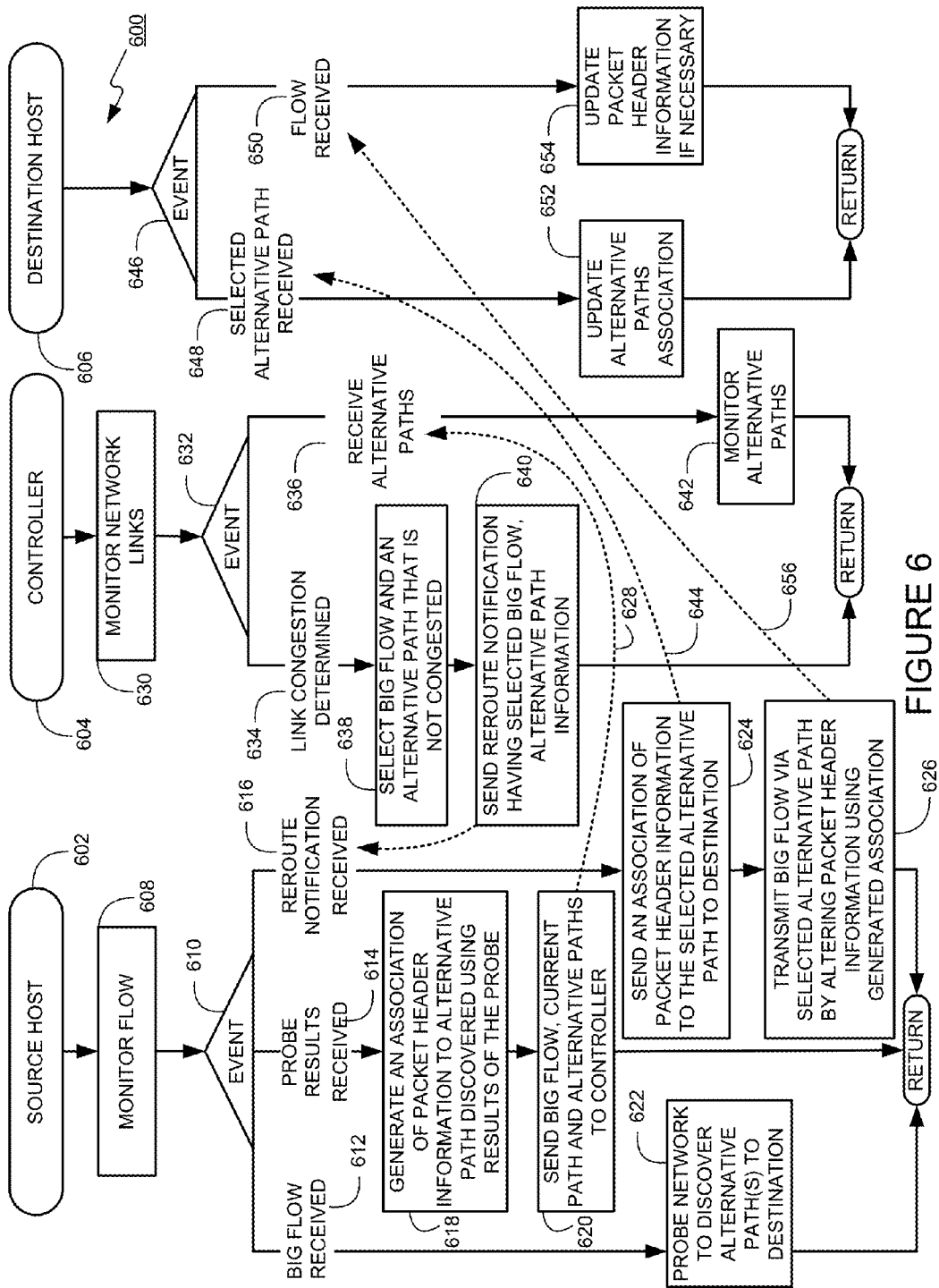

FIG. 6 includes flow diagrams of exemplary methods performed at a source host, a controller and a destination host, for performing flow-based routing, in a manner consistent with the present invention.

Figure 7:
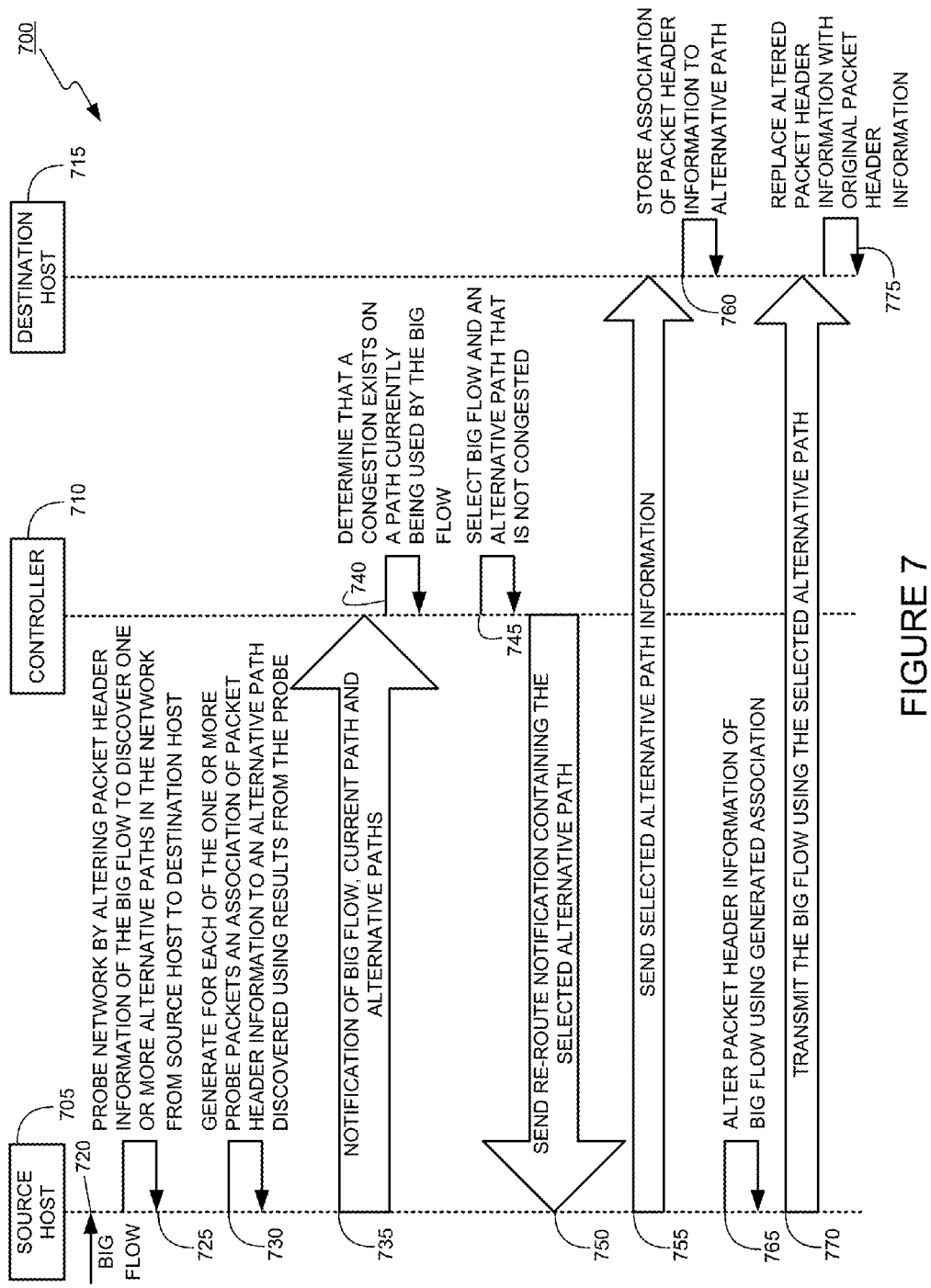

FIG. 7 is a messaging diagram for performing flow-based routing, in a manner consistent with the present invention.

Figure 8:
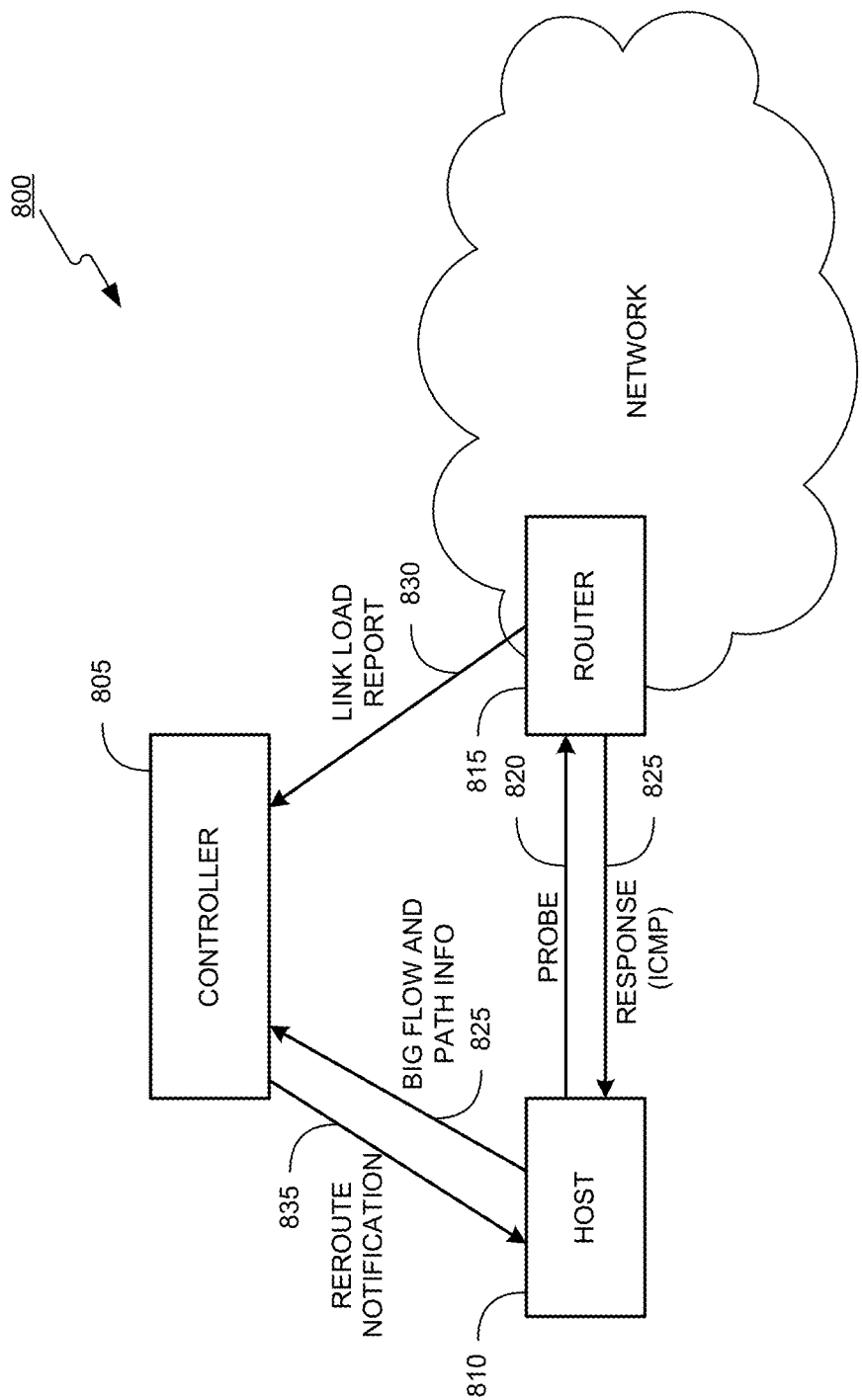

FIG. 8 is a diagram of communications system components for performing flow-based routing, in a manner consistent with the present invention.

Figure 9:
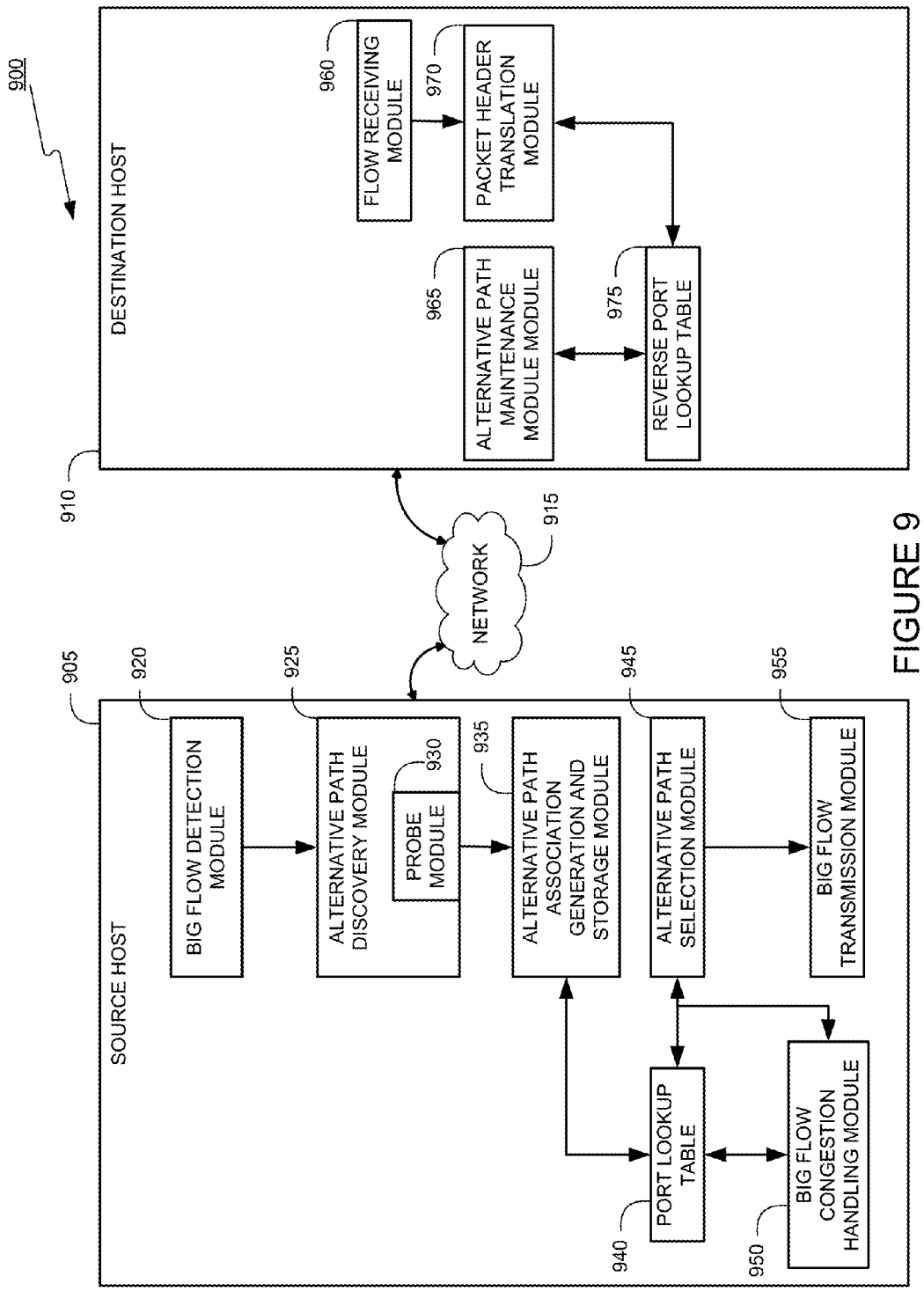

FIG. 9 illustrates block diagrams of an exemplary source and an exemplary destination host in an exemplary system for performing flow-based routing, in a manner consistent with the present invention.

Figure 10:
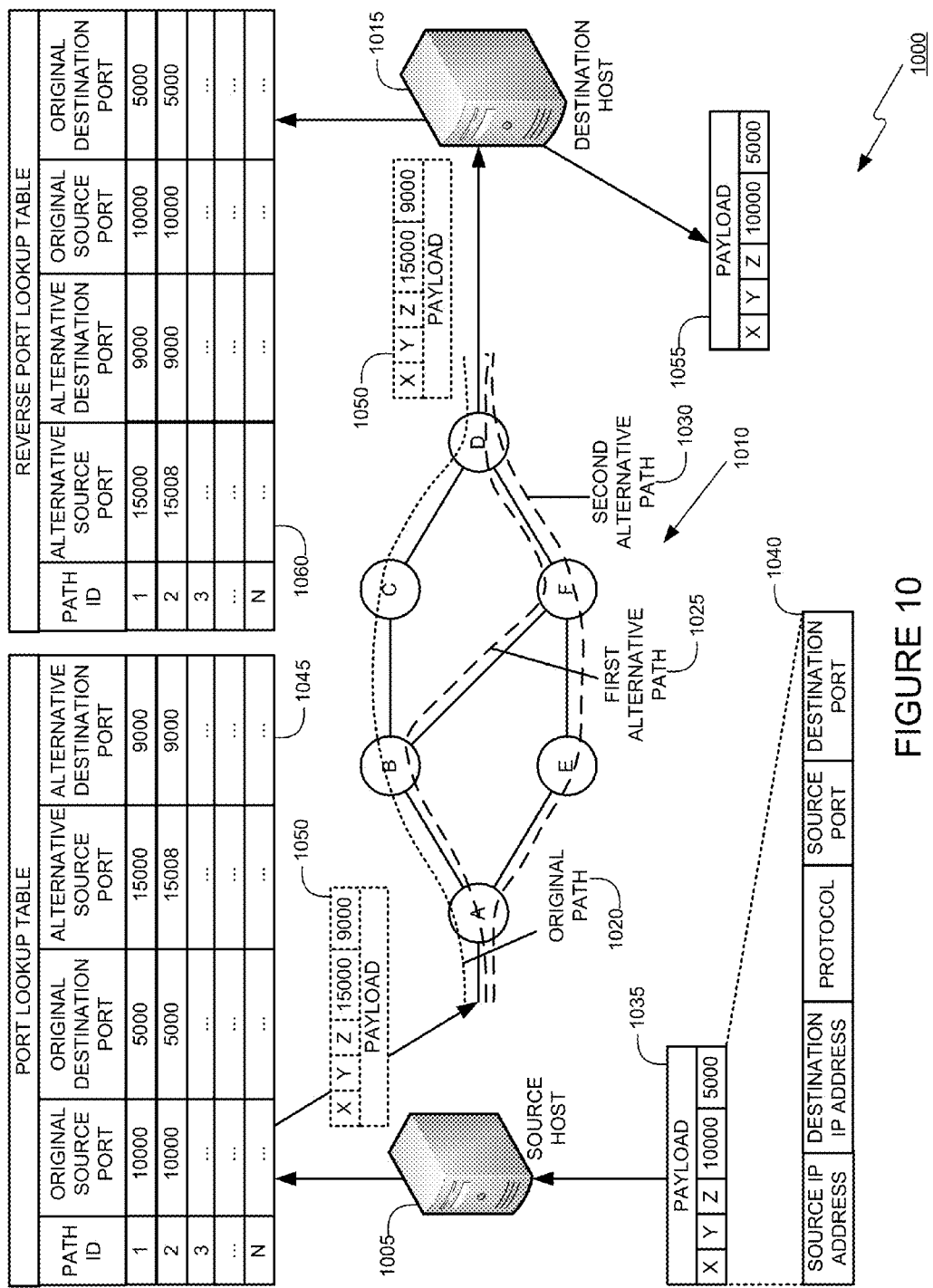

FIG. 10 is an example which illustrates an exemplary flow-based routing consistent with the present invention, in an exemplary network.

Figure 11:
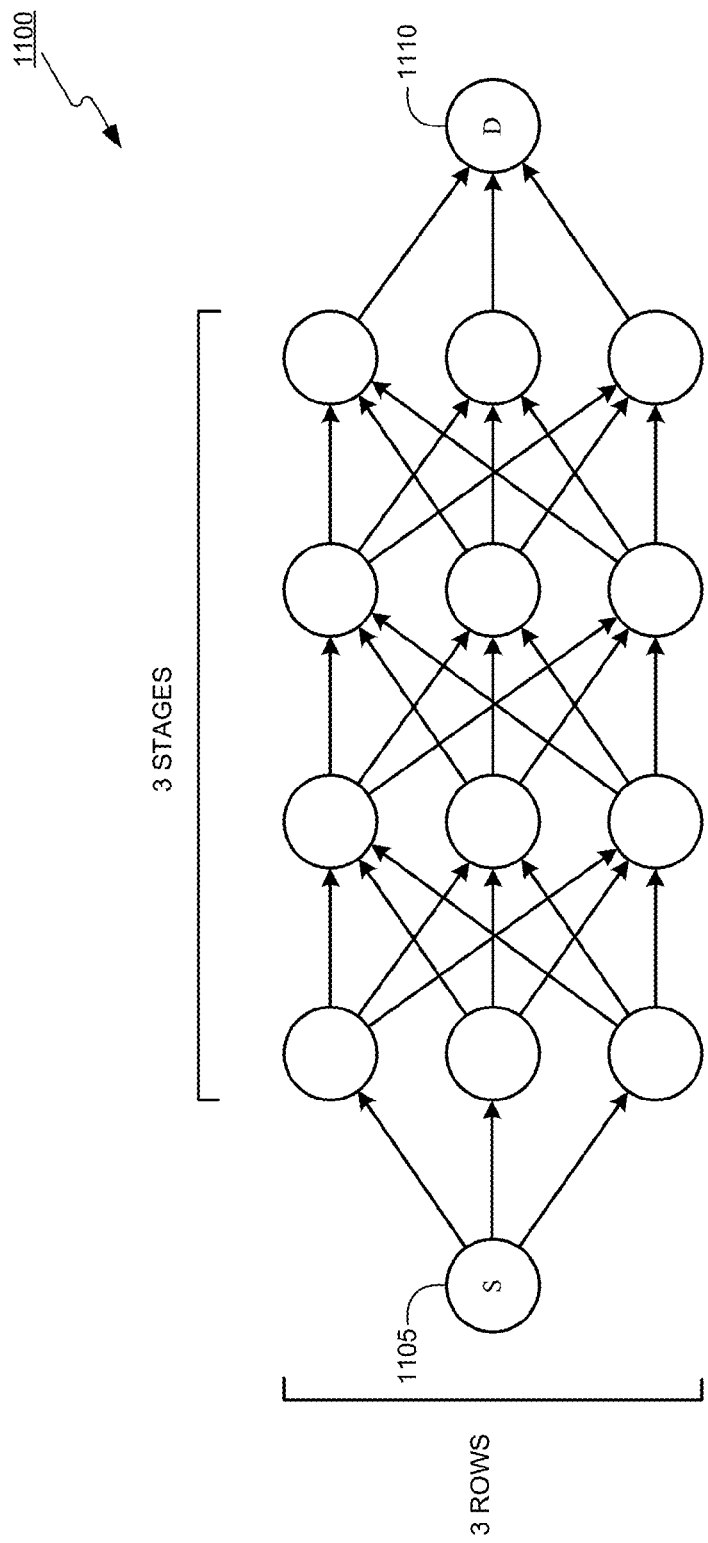

FIG. 11 illustrates an exemplary network topology in which an exemplary probing process was simulated in a manner consistent with the present invention.

Figure 12:
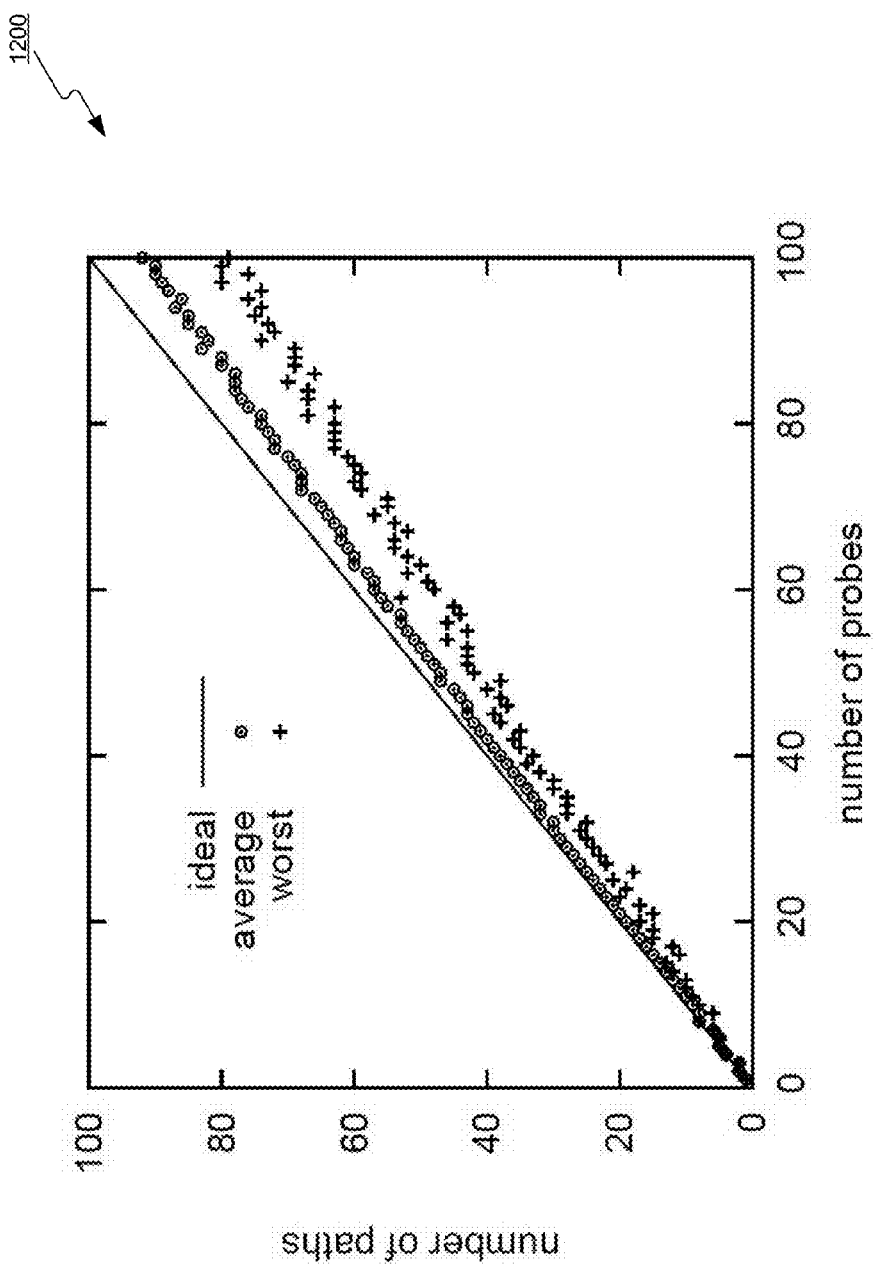

FIG. 12 illustrates a number of alternative paths discovered for different number of probes, in a simulation consistent with the present invention.

Figure 13:
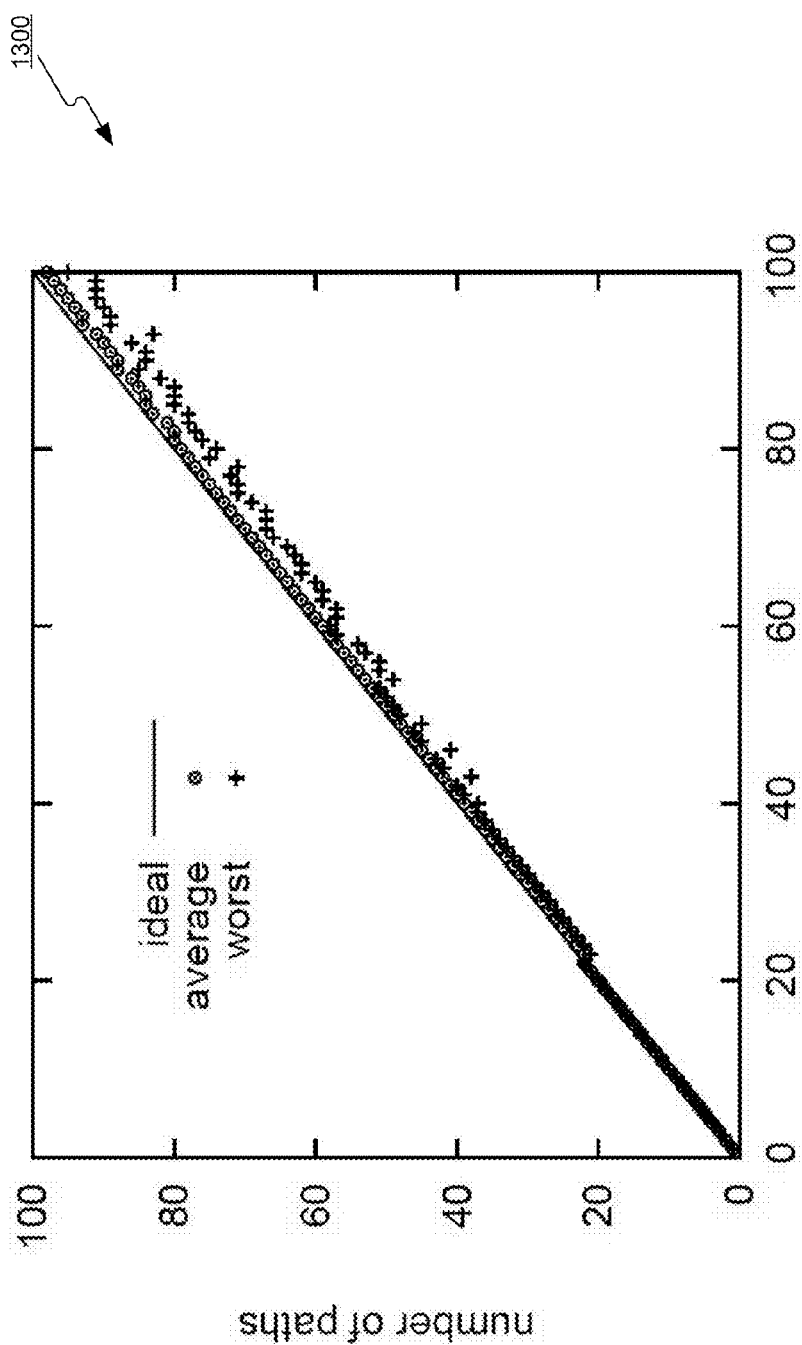

FIG. 13 illustrates a number of alternative paths discovered for different number of probes, in a simulation consistent with the present invention.

4. DETAILED DESCRIPTION

The present invention may involve novel methods, apparatus, message formats, and/or data structures for performing load balancing in a network using flow-based routing. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

4.1 Exemplary Environment

Figure 1:
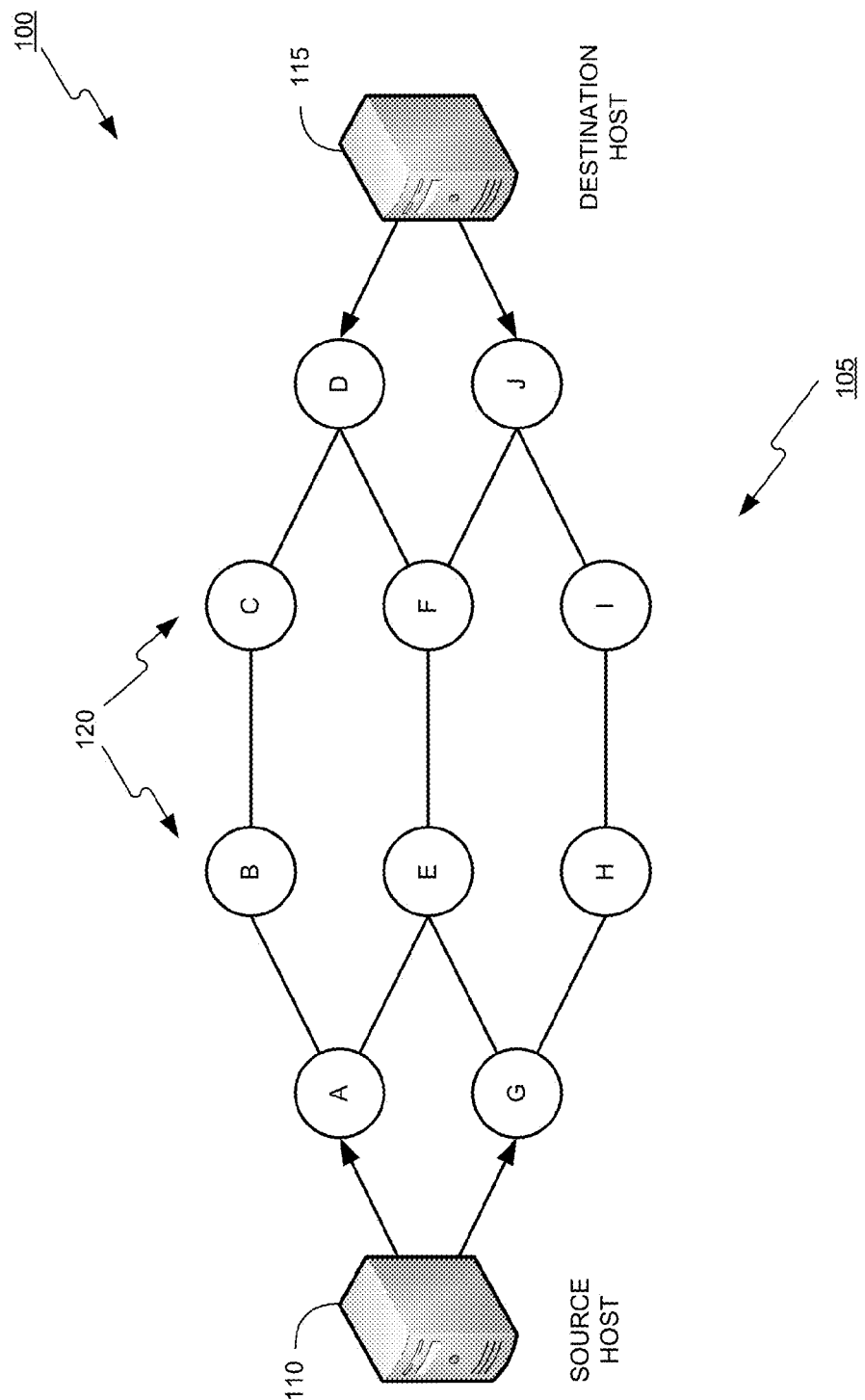
FIG. 1 illustrates an exemplary environment in which the present invention may operate.

FIG. 1 illustrates an exemplary environment 100 in which embodiments consistent with the present invention may operate. As shown, the environment 100 includes a network 105 having devices, such as, for example, source host 110, destination host 115 and nodes 120 (which includes node A to node J). In an exemplary embodiment consistent with the present invention, the nodes 120 may include, but are not limited to, a router, a switch, and/or a centralized controller that monitors network traffic. Data packets from the source host 110 are transmitted to the destination host 115 along a subset of the nodes 120. In an exemplary embodiment consistent with the present invention, the nodes 120 direct the data packets from the source host 110 to the destination host 115 using an equal cost multi path (ECMP) routing protocol. In such an exemplary embodiment, a data packet is directed from the source host 110 to destination host 115 based on header information (also called as a 5-tuple header field) of the data packet. The 5-tuple header fields include an Internet Protocol (IP) address of the source host 110, an IP address of the destination host 115, a source port number, a destination port number and a protocol type.

The source host 110 and/or destination host 115 in the network 120 may include, but are not limited to, a laptop computer, desktop computer, a tablet computer, a server, a router, a mobile phone, or any other device that has computing and networking capabilities. In exemplary environments, the network 105 may include, but is not limited to a local area network ("LAN"), wide area network ("WAN"), and a virtual private network ("VPN"). In an exemplary embodiment consistent with the present invention, the source host 110 may communicate with the destination host 115 using Transmission Control Protocol/Internet Protocol (TCP/IP). The network 105 may be a data center network.

4.2 Exemplary Apparatus

Embodiments consistent with the present invention might be implemented in hardware, such as one or more field programmable gate arrays ("FPGA"s), one or more integrated circuits such as an application specific integrated circuit ("ASIC"s), one or more network processors, etc. Alternatively, or in addition, embodiments consistent with the present invention might be implemented as stored program instructions executed by a processor.

Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

Figure 2:
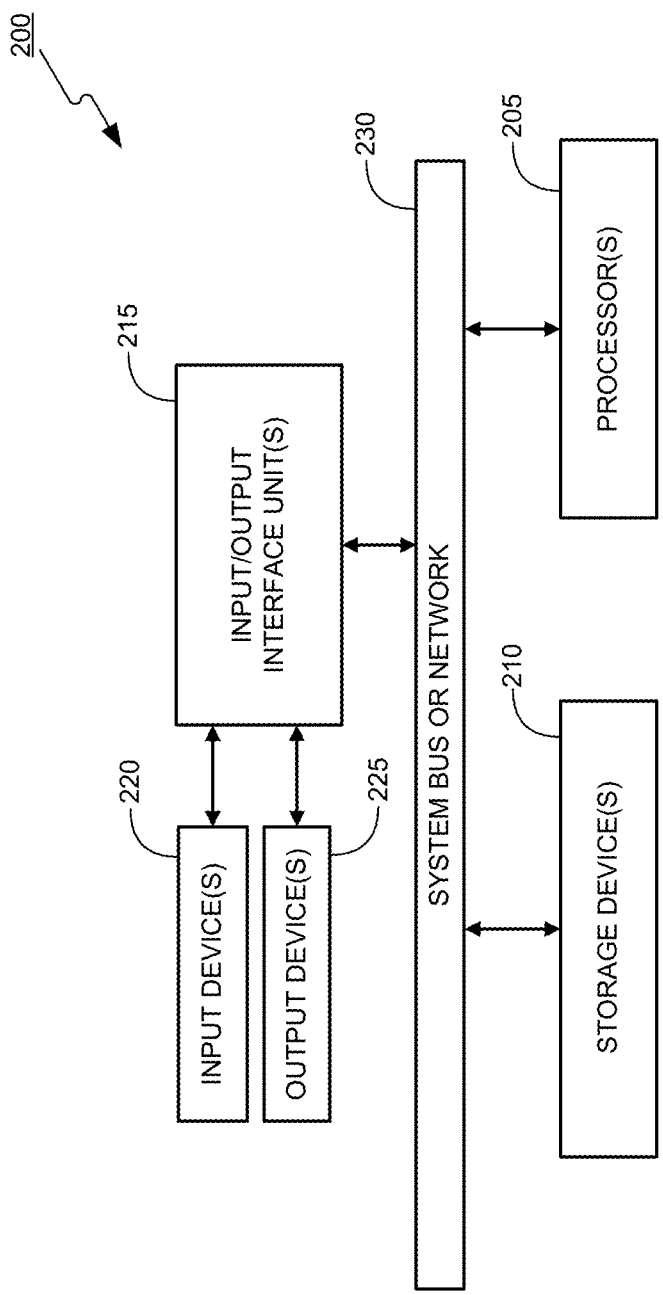
FIG. 2 is a block diagram of an exemplary apparatus that may perform various operations, and store various information generated and/or used by such operations, in a manner consistent with the present invention.

FIG. 2 is a block diagram of an exemplary machine 200 that may perform one or more of the processes described, and/or store information used and/or generated by such processes. The exemplary machine 200 includes one or more processors 205, one or more input/output interface units 215, one or more storage devices 210, and one or more system buses and/or networks 230 for facilitating the communication of information among the coupled elements. One or more input devices 220 and one or more output devices 225 may be coupled with the one or more input/output interfaces 215. The one or more processors 205 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 210 and/or may be received from an external source via one or more input interface units 215. The machine executable instructions may be stored as various software modules, each module performing one or more operations. Functional software modules are examples of components of the invention.

In some embodiments consistent with the present invention, the processors 205 may be one or more microprocessors. The bus 230 may include a system bus. The storage devices 210 may include system memory, such as read only memory (ROM) and/or random access memory (RAM). The storage devices 210 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

Embodiments of the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

4.3 Exemplary Methods for Performing Flow-Based Routing Using Probe

Figure 3:
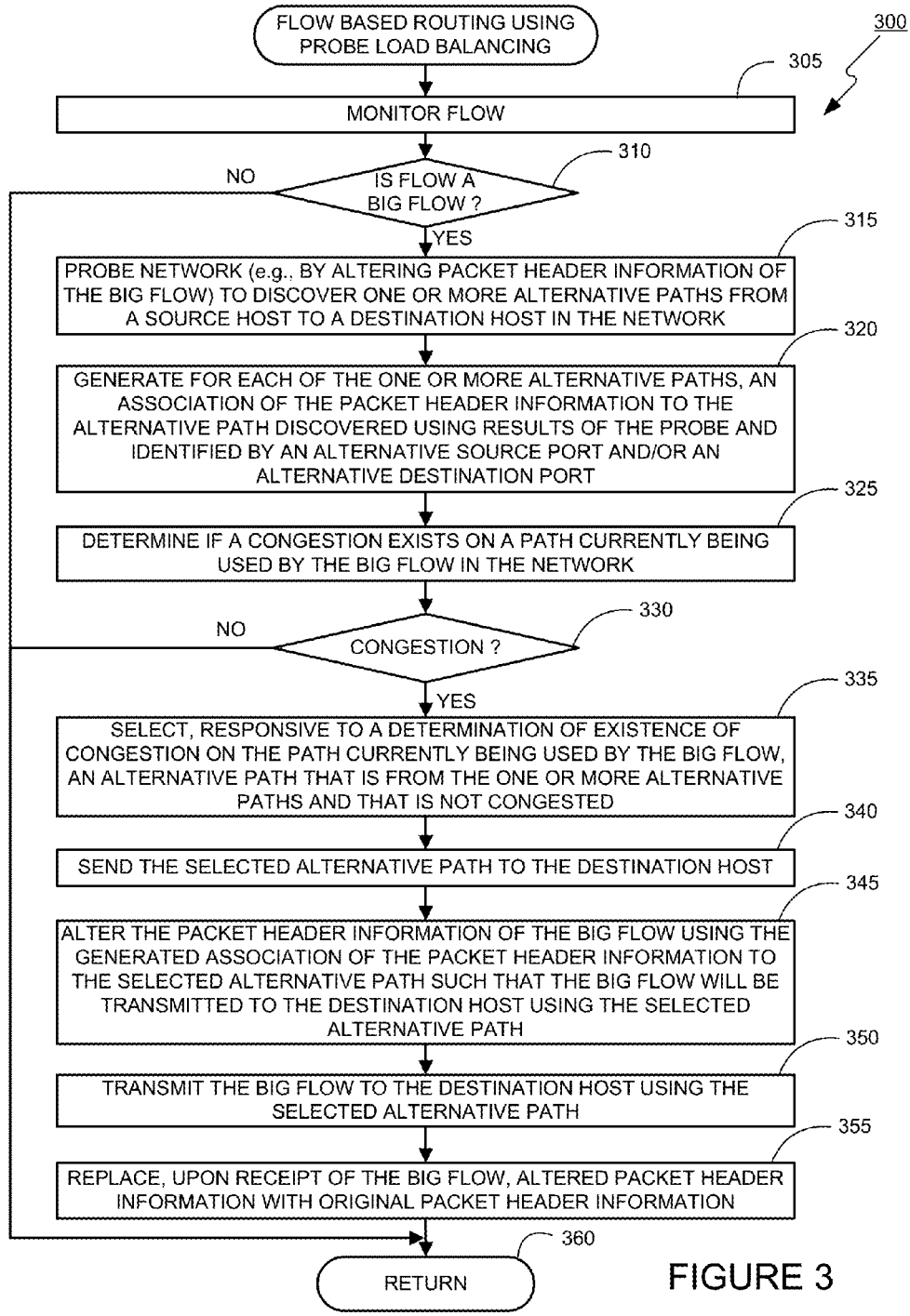
FIG. 3 is a flow diagram of an exemplary method for performing a flow-based routing using Probe and RerOute Based on ECMP (PROBE), in a manner consistent with the present invention.

FIG. 3 is a flow diagram of an exemplary method 300 for performing a flow-based routing using Probe and RerOute Based on ECMP (PROBE) load balancing, in a manner consistent with the present invention. The method 300 may be used in an environment such as the environment 100 described above with reference to FIG. 1. At block 305, data flow from a source host is monitored. The data flow has packet header information identifying a source host and a destination host of the data flow in a network. At block 310, it is determined whether the data flow is a big flow. If it is determined that the data flow is not a big flow, the method 300 is left at return node 360. Referring back to block 315, if it is determined that the data flow is a big flow, the network is probed (e.g. by altering packet header information of the big flow) to discover one or more alternative paths from the source host to the destination host in the network. At block 320, an association of the packet header information of the big flow to an alternative path, identified by an alternative source port number and/or an alternative destination port number, is generated for each of the one or more alternative paths discovered using results of probing the network at block 315.

At block 325, it is determined if a congestion exists on a path currently being used by the big flow in the network. In an exemplary embodiment consistent with the present invention, the existence of congestion is determined by at least one of the source host and the destination host. At block 330, if it is determined that there is no congestion, the method 300 is left at return node 360. Referring back to block 330, if it is determined that congestion exists, then at block 335, responsive to a determination of the existence of congestion on the path currently being used by the big flow, an alternative path that is not congested is selected from the one or more alternative paths discovered at block 315. In some exemplary embodiments consistent with the present invention, the alternative path is selected by the source host, and/or by the destination host. At block 340, the selected alternative path is sent to the destination host. At block 345, the packet header information of the big flow is altered using the generated association of the packet header information to the selected alternative path such that the big flow will be transmitted from the source host to the destination host using the selected alternative path. At block 350, the big flow is transmitted to the destination host using the selected alternative path. In an exemplary embodiment consistent with the present invention, the big flow is transmitted to the destination host using ECMP routing protocol. At block 355, the destination host receives the big flow and replaces the altered packet header information with the original packet header information.

Referring back to block 310, in at least some embodiments consistent with the present invention, the data flow may be categorized as a big flow if the data flow lasts longer than a predetermined duration threshold, and/or if the data flow has a bit rate that is higher than a predetermined rate threshold.

Referring back to block 320, in at least some exemplary embodiments consistent with the present invention, the association of the packet header information of the big flow to an alternative path includes an association of the source port number, and/or the destination port number in the packet header information of the big flow to the source port number, and/or the destination port number of the alternative path. In an exemplary embodiment consistent with the present invention, such an association may be stored in a port lookup table at the source host. The port lookup table enables identifying, for a given source port number and/or destination port number, the alternative source port number and/or the alternative destination port number of the one or more discovered alternative paths from the source host to the destination host. Storing such associations may eliminate the need to probe the network repeatedly to discover one or more alternative paths for the same set of source host and destination host pairs.

Referring back to block 340, in at least some exemplary embodiments consistent with the present invention, the destination host receives an association of the source port number, and/or the destination port number of the packet header information to the source port number, and/or the destination port number corresponding to the selected alternative path. In an exemplary embodiment consistent with the present invention, such an association may be stored in a reverse port lookup table at the destination host. The reverse port lookup table enables the destination host to find the original source port number, and/or destination port number of the received data flow using the source port number and/or destination port number in the altered header information of the received data flow. In an exemplary embodiment consistent with the present invention, the source host sends the selected alternative path information to the destination host as soon as an alternative path is selected to transmit the big flow and before transmitting the big flow. This ensures that the port lookup table at the source host and the reverse port lookup table at the destination host are consistent.

Referring back to block 345, in some exemplary embodiments consistent with the present invention, only a source port number and/or port destination number is altered in the packet header information of the big flow. In at least some embodiments, the other three fields, namely, source IP address, destination IP address and protocol type may not be altered. The source port number and/or destination port number in the packet header information of the big flow is changed to a corresponding source port number and/or destination port number of the selected alternative path.

Referring back to block 355, in some exemplary embodiments consistent with the present invention, the altered packet header information is replaced with the original packet header information using the stored association of the altered packet header information to the original header information at the destination host.

4.3.1 Probing the Network

Figure 4:
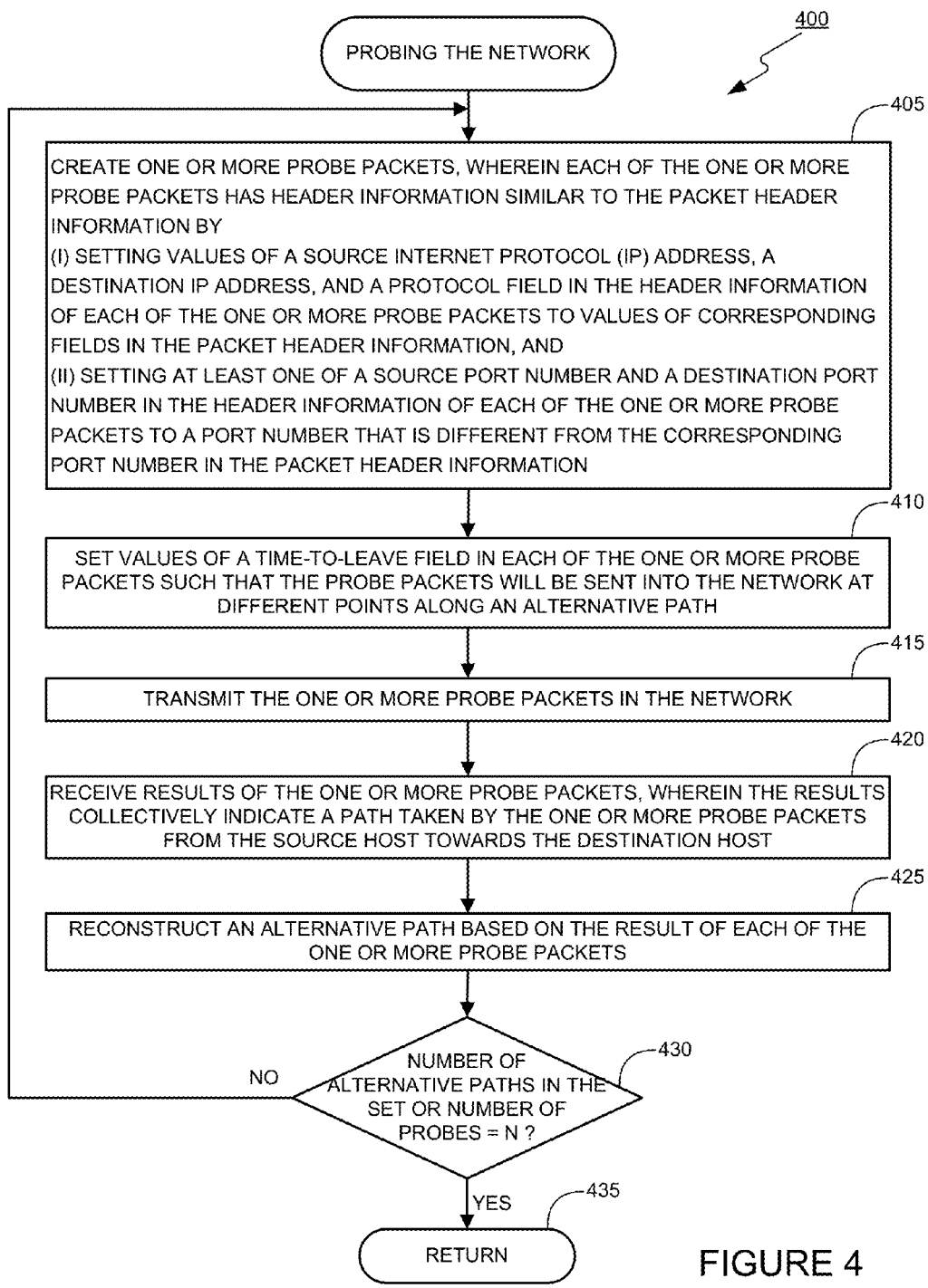
FIG. 4 is a flow diagram of an exemplary method for probing a network, in a manner consistent with the present invention.

Referring back to block 315, in at least some embodiments consistent with the present invention, alternative paths may be discovered by probing the network using exemplary method 400 of FIG. 4. At block 405, one or more probe packets are created with the header information of each of the one or more probe packets similar to the packet header information of the big flow. The header information of the one or more probe packets may be made similar to the packet header information of the big flow by (i) setting values of a source IP address, a destination IP address, and a protocol field in the header information of each of the one or more probe packets to values of corresponding fields in the packet header information, and (ii) setting a source port number, and/or a destination port number in the header information of each of the one or more probe packets to a port number that is different from the corresponding port number in the packet header information.

At block 410, the value of a time-to-live (TTL) field in each of the one or more probe packets is set such that the probe packets will be sent into the network up to different points along an alternative path. In an exemplary embodiment consistent with the present invention, the one or more probe packets are transmitted in the network such that the one or more probe packets traverse multiple hops of the same alternative path and multiple alternative paths in parallel. At block 420, the results of one or more probe packets which collectively indicate a path taken by the one or more probe packets from the source host towards the destination host are received. At block 425, an alternative path from the source host to the destination host is reconstructed using the results of the one or more probe packets. At block 430, it is determined if a predetermined number of probes are performed or if a predetermined number of alternative paths are discovered. If it is determined that a predetermined number of probes are performed or a predetermined number of alternative paths are discovered, then the method 400 is left via return node 435; otherwise, the control is returned to block 405.

Still referring FIG. 4, in an exemplary embodiment consistent with the present invention, the method 400 is performed by end hosts (for example, source host 110 and destination host 115 of FIG. 1). In an exemplary embodiment consistent with the present invention, all functional modules for probing the network are implemented in software and are run as software agents on end hosts. This enables easy deployment in existing data center networks. Since the end hosts need not participate in routing the data, they typically need not have the topology information and routing information. The end hosts probe the network to find the alternative path information.

4.3.2 Alternatives, Refinements and Extensions

Although the determination of existence of congestion and selection of the alternative path from the source host to the destination host is determined by at least one of the source host and the destination host in the above method 300, they may be determined differently. For example, in another exemplary embodiment consistent with the present invention, the determination of existence of congestion on path currently used by the big flow and a selection of the alternative path from the source host to the destination host may be performed by a centralized controller in a network. The centralized controller may also monitor traffic in the network. In an exemplary embodiment consistent with the present invention, the centralized controller may include, but is not limited to, a router, a computer, or any other device that has networking and computing capabilities.

Figure 5:
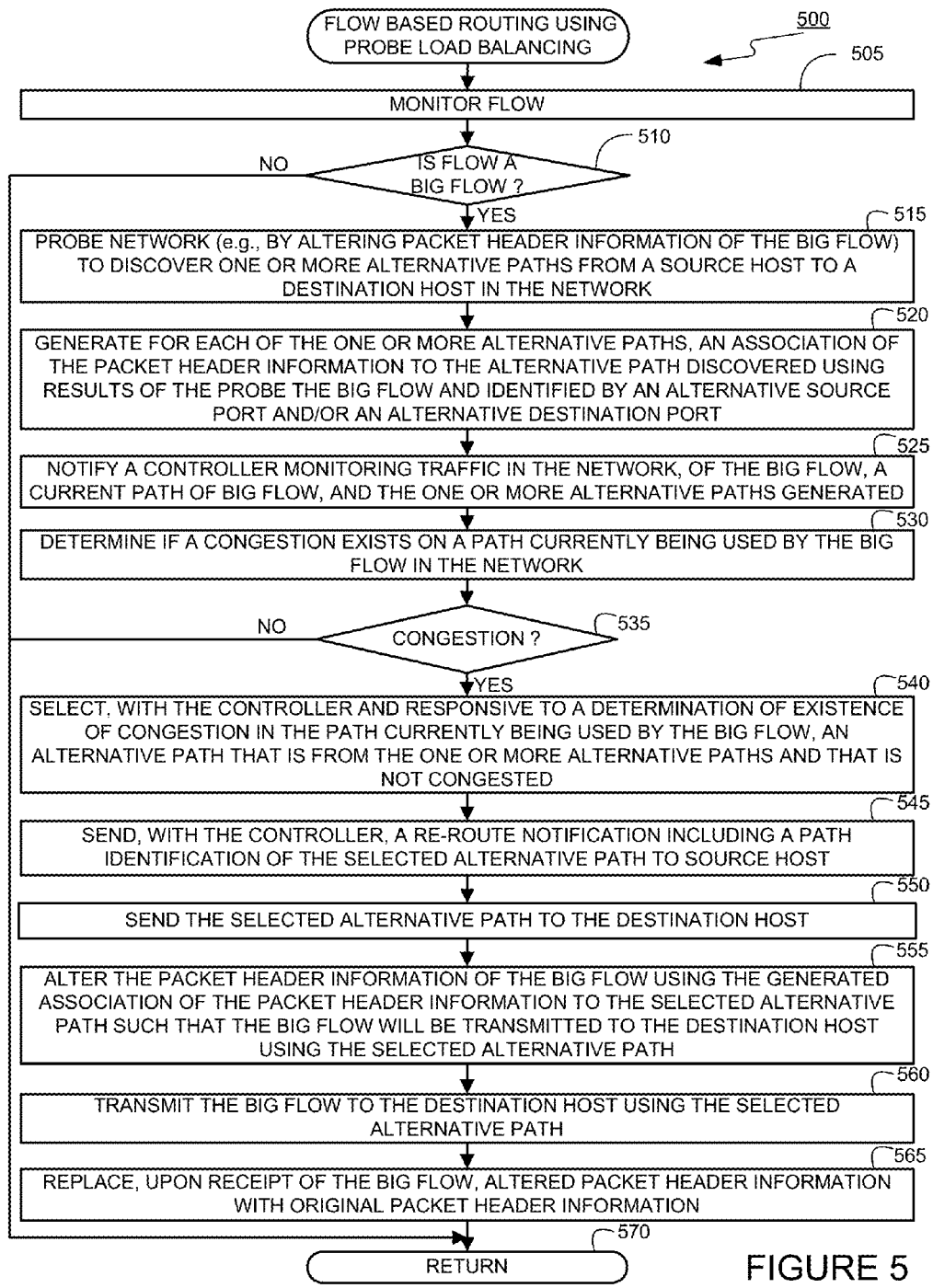
FIG. 5 is a flow diagram of an exemplary method for performing a flow-based routing using Probe and RerOute Based on ECMP (PROBE) in a network having a centralized controller, in a manner consistent with the present invention.

FIG. 5 is a flow diagram of an exemplary method 500 for performing a flow-based routing using PROBE load balancing in a network having a centralized controller, in a manner consistent with the present invention. The method 500 may be used in an environment such as the environment 100 described above with reference to FIG. 1. At block 505, data flow from a source host is monitored. The data flow has packet header information identifying a source host and a destination host of the data flow in a network. At block 510, it is determined whether the data flow is a big flow. If it is determined that the data flow is not a big flow, the method 500 is left at return node 570. Referring back to block 515, if it is determined that the data flow is a big flow, the network is probed (e.g. by altering packet header information of the big flow) to discover one or more alternative paths from the source host to the destination host in the network. At block 520, an association of the packet header information of the big flow to an alternative path, identified by an alternative source port number, and/or an alternative destination port number, is generated for each of the one or more alternative paths discovered using results of probing the network at block 515. At block 525, a controller monitoring traffic in the network is notified of the big flow, its current path and the one or more alternative paths discovered at block 515.

At block 530, the controller determines if congestion exists on a path currently being used by the big flow in the network. In an exemplary embodiment consistent with the present invention, a traffic load on each link in the network is (e.g. constantly) measured and reported to the controller. This assists the controller in making rerouting decisions. At block 535, if it is determined that there is no congestion, the method 500 is left at return node 570. Returning to block 535, if it is determined that there is congestion, then at block 540, responsive to a determination of the existence of congestion on the path currently being used by the big flow, an alternative path that is not congested is selected by the controller from the one or more alternative paths discovered at block 515. At block 545, the controller sends a reroute notification including path identification (ID) of the selected alternative path to the source host. In some exemplary embodiments consistent with the present invention, responsive to a reroute request for the big flows, the controller (1) selects, a big flow and an alternative path for the big flow, that is not congested and (2) sends a reroute notification including a flow ID of selected the big flow and the path ID of the selected alternative path. At block 550, the selected alternative path is sent to the destination host. At block 555, the packet header information of the big flow is altered using the generated association of the packet header information to the selected alternative path such that the big flow will be transmitted from the source host to the destination host using the selected alternative path. At block 560, the big flow is transmitted to the destination host via the selected alternative path. In an exemplary embodiment consistent with the present invention, the big flow is transmitted to the destination host using ECMP routing protocol. At block 565, the destination host receives the big flow and replaces the altered packet header information with the original packet header information. The method 500 is then left via return node 570.

FIG. 6 illustrates an exemplary method 600 of flow-based routing in a network having a centralized controller. FIG. 7 illustrates exemplary messaging between a source host, a controller and a destination host under the exemplary method 600 of FIG. 6. A data flow at a source host 705 is monitored. (Also, see 602 and 608 of FIG. 6.) At 720, the existence of a big flow is determined. (Also, see 610 and 612 of FIG. 6.) At 725, the source host 705 probes the network by altering packet header information of the big flow to discover one or more alternative paths from the source host 705 to the destination host 715 in the network. (Also, see 622 of FIG. 6.) At 730, after receiving results from the probing the network, an association of the packet header information of the big flow to an alternative path, identified by an alternative source port, and/or an alternative destination port, is generated for each of the one or more alternative paths discovered using results of probing the network. (Also, see 614 and 618 of FIG. 6.) As shown by message 735, the source host 705 notifies a controller 710 of the big flow, its current path and the one or more alternative paths discovered at 725. (Also, see 604, 620, 628, 630, 632, 636 and 642 of FIG. 6.) The controller 710 may monitor traffic in the network.

At 740, the controller 710 determines if congestion exists on a path currently being used by the big flow in the network. (Also, see 604, 620, 632 and 642 of FIG. 6.) In an exemplary embodiment consistent with the present invention, the traffic load of each link in the network is constantly measured and reported to the controller 710. This assists the controller 710 in making rerouting decisions. At 745, responsive to a determination of the existence of congestion on (at least a part of) the path currently being used, an alternative path that is not congested is selected from the one or more alternative paths discovered at 725 by the controller 710. (Also, see 604, 634, and 638 of FIG. 6.) In an exemplary embodiment consistent with the present invention, the controller 710 selects for rerouting, from one or more reroute requests for the big flows, a big flow and an alternative path for the big flow that is not congested. As shown by message 750, the controller 710 sends a reroute notification, including a path identification (ID) and the selected alternative path to the source host 715. (Also, see 640 of FIG. 6.) As shown by message 755, the source host 705, responsive to the receipt of the reroute notification, sends the selected alternative path to the destination host 715. (Also, see 610, 616 and 624 of FIG. 6.) In an exemplary embodiment consistent with the present invention, the destination host 715 receives the selected alternative path information as an association of a source port number, and/or a destination port number of the packet header information to a source port number, and/or a destination port number corresponding to the selected alternative path. At sequence 760, responsive to receipt of the selected alternative path information, the destination host 715 stores the association of the packet header information to the selected alternative path. (Also, see 606, 646, 648 and 652 of FIG. 6.) In an exemplary embodiment consistent with the present invention, such an association is stored at the destination host 715 in a reverse port look up table.

At 765, the packet header information of the big flow is altered using the generated association of the packet header information to the selected alternative path such that the big flow will be transmitted from the source host to the destination host using the selected alternative path. (Also, see 610, 616, 624 and 644 of FIG. 6.) As shown by message 770, the big flow is transmitted to the destination host 715 via the selected alternative path. (Also, see 626 and 656 of FIG. 6.) At 775, the destination host 715 receives the big flow and replaces, if necessary, the altered packet header information with the original packet header information. (Also, see 646, 650 and 654 of FIG. 6.) In an exemplary embodiment consistent with the present invention, the altered packet header information is replaced with original packet header information using the reverse port lookup table at the destination host 715. In an exemplary embodiment consistent with the present invention, if the destination host 715 does not find an entry in the reverse port lookup table for the port numbers of the packet header information of the received big flow, then it may be implied that the big flow was transmitted using its original path and not an alternative path. In such a case, the packet header information of the big flow is unaltered by the source host 705 and therefore, is not replaced by the destination host 715.

FIG. 8 is a block diagram of a system 800 for performing flow-based routing, in a manner consistent with the present invention. The system 800 includes a host 810 (similar to a source host 110 or destination host 115 of environment 100 of FIG. 1), a controller 805 that monitors traffic in the network and a node such as a router 815 that routes traffic between one or more hosts 810 using ECMP routing protocol. If the host 810 detects a big flow, it sends a probe request 820 to the router 815 in the network to discover one or more alternative paths from a source host to a destination host in the network. The router 815 sends or forwards a response 825 for the probe request 820 back to the host 810. Note that the host 810 may send other similar probe requests to other routers (not shown) in the network. Further, the host 810 will typically issue multiple probes 820 (e.g. with different TTL values) and receive multiple responses 825.

In an exemplary embodiment consistent with the present invention, the response is sent using Internet Control Message Protocol. The host 810 reconstructs the one or more alternative paths using the responses 825 from the router 815. The host 810 notifies a controller 805 of the big flow and the discovered one or more alternative paths information 825. The controller 805, which may monitor the traffic in the network, determines if a congestion exists on (at least a part of) a path currently being used by the big flow in the network. If congestion exists, an alternative path that is not congested is selected by the controller 805 from the one or more alternative paths 825. In an exemplary embodiment consistent with the present invention, the router 815 sends a link load report 830 including traffic load of each link in the network to the controller 805. Other routers (not shown) of the network may also send such reports to the controller 805. This assists the controller in making rerouting decisions. The controller 805 sends a reroute notification 835, including path identification of the selected alternative path, to the host 810. The host 810 alters the packet header information of the big flow using the selected alternative path information such that the big flow will be transmitted to the destination host using the selected alternative path. Finally, the host 810 transmits the big flow to the destination host via the selected alternative path.

FIG. 9 illustrates an exemplary system 900 for performing flow-based routing, in a manner consistent with the present invention. The source host 905 and the destination host 910 are similar to the source host 110 and destination host 115, respectively, in environment 100 of FIG. 1. The source host 905 transmits data flows to destination host 910 via network 915. The source host includes big flow detection module 920, alternative path discovery module 925, alternative path association generation and storage module 935, port lookup table 940, alternative path selection module 945, big flow congestion handling module 950 and a big flow transmission module 955. The destination host 910 includes flow receiving module 960, alternative path maintenance module 965, packet header translation module 970 and a reverse port lookup table 975. Note that in alternative embodiments, at least some of these modules may be provided in a central controller.

The big flow detection module 920 monitors data flow out of source host 905 and determines if the data flow is a big flow. In an exemplary embodiment consistent with the present invention, flow detection may be performed based on flow sampling, where packets of the data flow are periodically sampled to measure the rate of flows, using methods such as sFlow. (See, for e.g., P. Phaal, S. Panchen, and N. McKee, "Mon Corporation's sFlow: A Method for Monitoring Traffic in Switched and Routed Networks," RFC 3176 (*Informational*), (September 2001), incorporated herein by reference.) and Cisco NetFlow (See, e.g., B. Claise, "Cisco Systems NetFlow Services Export Version 9," RFC 3954 (*Informational*), (October 2004), incorporated herein by reference.)

Responsive to the detection of big flow, the alternative path discovery module 925 probes the network 915 to discover one or more alternative paths from the source host 905 to destination host 910. A probe module 930 in the alternative path discovery module 925 creates one or more probe packets and transmits them into the network. In an exemplary embodiment consistent with the present invention, the probing method may be similar to a traceroute or tcptraceroute (See, e.g., M. C. Toren, "tcptraceroute," http://michael.toren.net/code/tcptraceroute, incorporated herein by reference) or Paris traceroute (See, e.g., B. Augustin, X. Cuvellier, B. Orgogozo, F. Viger, T. Friedman, M. Latapy, C. Magnien, and R. Teixeira, "Avoiding Traceroute Anomalies With Paris Traceroute," *IMC*, (2006), incorporated herein by reference). In an exemplary embodiment consistent with the present invention, the one or more probe packets may be transmitted in different ways to ensure minimum delay in receiving the results. In at least some exemplary methods, probes are triggered immediately after the big flow is detected, which is most likely before congestion occurs. In at least some exemplary methods, multiple hops in a path are probed in parallel. That is, the software agent on the source host sends out multiple packets with the TTL fields set to 1, 2, 3 etc., where the TTL field indicates a number of hops from the source host to the destination host. Consequently, the probe delay does not increase with the hop count. In at least some exemplary methods, multiple paths are probed in parallel, for example, ten probes (with ten different source and destination port pair values) may be executed at once. In at least some exemplary methods, the routers may be configured to process and respond to such probe packets with high priority, thus reducing the delay. The alternative path discovery module 925 receives results from the probe and then reconstructs the one or more alternative paths using the received results. The alternative path association generation and storage module 935 associates the packet header information of the big flow to each one of the one or more alternative paths and stores the associations in the port look up table 940.

The big flow congestion handling module 950, which monitors data traffic in the network 915, is aware of the traffic load on various links in the network. The alternative path selection module 945, (1) based on the congestion data from the big flow congestion handling module 950, selects an alternative path from the one or more alternative paths (that were discovered by the alternative path discovery module 925) that is not congested, and (2) notifies the big flow transmission module 955 of the selected alternative path. The alternative path selection module 945 sends the selected alternative path information to the destination host 910. The big flow transmission module 955 alters the packet header information of the big flow using the association of the packet header information to the selected alternative path stored in the port lookup table such that the big flow will be transmitted using the selected alternative path. The big flow transmission module 955 transmits the big flow with the altered packet header information into the network 915, after which, the big flow reaches the destination host 910 via the selected alternative path.

In an exemplary embodiment consistent with the present invention, the source host 905 and the destination host 910 maintain a permanent TCP connection to exchange control messages. This allows the alternative path selection module 945 to send the selected alternative path information to the destination host 910 as soon as an alternative path is selected to transmit the big flow, and before transmitting the big flow. The alternative path maintenance module 965 of the destination host 910 stores the selected alternative path information in a reverse port lookup table 975. This ensures that the port lookup table 940 at the source host 905 and the reverse port lookup table 975 at the destination host 910 are coordinated. In an exemplary embodiment consistent with the present invention, the port lookup table 940 and the reverse port lookup table 975 may be updated as needed, when the network topology changes. This may be done by probing the network 915 when the network topology changes.

The flow receiving module 960 of the destination host 910 receives the data flow from the network 915. The packet header translation module 970 inspects the packet header information of the received data flow and, if necessary, replaces the altered header information with original packet header information using the associations of the one more alternative paths to the original packet header information stored in the reverse port lookup table 975. In an exemplary embodiment consistent with the present invention, if the packet header translation module 970 at the destination host 910 does not find an entry in the reverse port lookup table 975 for the port numbers of the packet header information, then it may be implied that the data flow was not transmitted using an alternative path. In such a case, it is assumed that the packet header information of the data flow was not altered by the source host 905 and therefore, is not replaced by the destination host 910.

4.4 Illustrative Examples of Operation

An example illustrating an exemplary method of flow-based routing using PROBE for load balancing is now described with reference to FIG. 10. As shown in FIG. 10, environment 1000 includes a source host 1005, a destination host 1015 and a network 1010 through which data flow 1035 is transmitted from the source host 1005 to the destination host 1015. The network 1010 includes node A, node B, node C, node D, node E and node F. In this illustrative example, each of the nodes is assumed to be a router. The routers transmit the data flow 1035 from the source host 1005 to the destination host 1015 using ECMP routing protocol. In this illustrative example, it is assumed that the data flow 1035 is a big flow 1035. The big flow 1035 includes a payload and packet header information 1040. The packet header information 1040 is 5-tuple header field including a source IP address field, a destination IP address field, protocol field, a source port number field and a destination port number field with values X, Y, Z, 10000 and 5000, respectively. The original path 1020 of the big flow 1035 from source host 1005 to destination host 1015 may be indicated as source host 1005-router A-router B-router C-router D-destination host 1015.

The source host 1005 monitors its data flow to the destination host 1015. (Recall 305 of FIG. 3.) The source host 1005 determines that data flow 1035 is a big flow 1035. (Recall 310 of FIG. 3.) The source host 1005 probes the network by altering packet header information 1040 to find one or more alternative paths to the destination host 1015. (Recall 315 of FIG. 3.) The source host 1005 creates one or more probe packets (not shown) and sets the header information of the probe packets to the packet header information 1040 of the big flow 1035. (Recall 405 of FIG. 4.) Then, the source host 1005 sets the source port number, and/or the destination port number in the header information of the one or more probe packets to a port number different from the original port number(s) in the packet header information 1040. (Recall 405 of FIG. 4.) In an exemplary probe, the source port number and the destination port number in the header information of the one or more probe packets is altered from 10000 and 5000 to 15000 and 9000, respectively. In another exemplary probe, the source port number and the destination port number in the header information of the one or more probe packets is set to 15008 and 9000, respectively. After altering at least one of the source port number and the destination port number, a TTL value or a hop count (indicating a number of hops from the source host towards the destination host) is set to a predetermined value. In the current embodiment, the TTL value may range from 1 to 4, indicating the number of hops from source host 1005 to destination host 1015. (Recall 410 of FIG. 4.) The one or more probe packets are transmitted into the network 1010. The routers respond to the probe packets by sending a response back to the source host 1005. The results collectively indicate a path traversed by the one or more probe packets from the source host 1005 towards the destination host 1015 for a particular pair of source port number and destination port number in the header information of the one or more probe packets. The source host 1005 receives the result of the one or more probe packets and reconstructs the one or more alternative paths using the result of the probe. (Recall 420 and 425 of FIG. 4.) The alternative paths discovered as a result of the first and second exemplary probes include a first alternative path 1025 and a second alternative path 1030, respectively. The first alternative path 1025 includes the path: source host 1005-router A-router B-router F-router D-destination host 1015. The second alternative path 1030 includes the path: source host 1005-router A-router E-router F-router D-destination host 1015.

The source host 1005 generates an association of the source port number, and/or the destination port number of packet header information 1040 to a source port number, and/or a destination port number corresponding to each of the first alternative path 1025 and the second alternative path 1030. (Recall 320 of FIG. 3.) The association is stored in a port lookup table 1045 in the source host 1005. The row with Path ID=1 indicates an association of the source and destination port numbers, 10000 and 5000, respectively, of the original packet header information 1040 to corresponding port numbers, 15000 and 9000, respectively, of the first alternative path 1025. Similarly, the row with Path ID=2 indicates an association of the source and destination port numbers, 10000 and 5000, respectively, of the original packet header information 1040 to corresponding port numbers, 15008 and 9000, respectively, of the second alternative path 1030.

It is determined whether congestion exists on the original path 1020 used by the big flow 1035. If an existence of congestion in the original path 1020 is determined, then one of the first alternative path 1025 and the second alternative path 1030 that is not congested is selected. (Recall 325 and 330 of FIG. 3.) The existence of congestion is determined by source host 1005, destination host 1015, and/or a controller (not shown) that monitors traffic in the network 1010. In this illustrative example, it is assumed that the original path 1020 and the second alternative path 1030 are congested and the first alternative path 1025 is not congested. Therefore, the first alternative path 1025 is selected. The first alternative path 1025 information is also sent to the destination host 1015, where it is stored in a reverse port lookup table 1060. (Recall 335 of FIG. 3.)

After the first alternative path 1025 is selected, the original packet header information 1040 of the big flow 1035 is altered to reflect the source port number=15000 and destination port number=9000 of the first alternative path 1025 while retaining the source IP address, destination IP address and the protocol. (Recall 340 of FIG. 3.) Accordingly, the altered header information 1050 of the big flow has the following values: source IP address=X, destination IP address=Y and protocol=Z, source port number=15000 and destination port number=9000. The original packet header information 1040 of the big flow 1035 is altered using the association of the original packet header information 1040 to the first alternative path 1025 stored in the port lookup table 1045. The big flow with altered header information 1050 is transmitted into the network 1010. The routers in the network 1010 forward the big flow, using the altered header information 1050 and ECMP routing protocol, to the destination host 1015 along the first alternative path 1025. (Recall 345 of FIG. 3.)

The big flow with altered header information 1050 is received at the destination host 1015. The destination host 1015 attempts to find, from the reverse port lookup table 1060, the original source and destination port number of the original path 1020 using the source and destination port number in the altered header information 1050. If the original source and destination port numbers of the original path 1020 are found in the reverse port lookup table, then the altered header information 1050 is updated to reflect the original source port number and the original destination port number of the original path 1020. In this illustrative example, the destination host 1015 replaces the altered header information 1050 with the original header information 1040 to obtain a big flow 1055 (similar to original big flow 1035). (Recall 350 of FIG. 3.) If the original source and destination port numbers were not found, then the altered header information 1050 would not have been updated (because the big flow 1035 would have been transmitted using its original path 1020).

4.5 Simulation Based Performance Evaluation

In this section, the effectiveness probing a network to find one or more alternative paths from a source host to a destination host in the network is described. Noting that ECMP distributes packets randomly (using hash function). Therefore, it is possible that two or more probe operations happen to give the same path. In a data center with rich connectivity (e.g., fat tree or Clos network topology), it is fairly easy to discover a number of different paths (not necessarily disjoint, though) using multiple probes. An in-depth study of this issue is performed as follows. For simplicity, a performance evaluation was conducted in a regular network topology 1100 of FIG. 11, where the source node 1105 connects to the destination node 1110 through a R-row, T-stage Clos network.

4.5.1 Analysis

Assuming all the links have equal cost, the total number of equal-cost shortest paths from source node 1105 to destination node 1110 is $R^{T+1}$. It is assumed that all the routers perform load balancing using independent, uniformly distributed hash functions. Given an existing path, the probability that a random probe finds a non-overlapping path is:

$$p_1 = 1 - \frac{1}{R^{T+1}} \quad (1)$$

Therefore, the average number of probes needed to find a different path is:

$$M_1 = \sum_{m=1}^{\infty} (m p_1 (1-p_1)^{m-1}) = \frac{1}{p_1} = \frac{R^{T+1}}{R^{T+1}-1} \quad (2)$$

Since data center networks are densely interconnected, the total number of path $R^{T+1}$ is a large number. Therefore, $M_1$ is close to 1, which means it is very easy to find a different path in just a few probes. The above analysis does not specifically require the new path to be link-disjoint from the existing one. Although PROBE does not require the reroute to be link-disjoint, it is interesting to study the probability. Based on simple analysis, the probability that a random probe gives a link-disjoint path is:

$$p_2 = \frac{R-1}{R} \left( \frac{R^2-1}{R^2} \right)^T \quad (3)$$

Similarly, the average number of probes needed to find a link-disjoint path is:

$$M_2 = \sum_{m=1}^{\infty}(mp_2(1-p_2)^{m-1}) = \frac{1}{p_2} = \frac{R}{R-1}\left(\frac{R^2}{R^2-1}\right)^T \quad (4)$$

For a small network with R=10 and T=5, the average number of probes is $M_2$=1.16.

4.5.2 Experiments and Results

The above analysis allows the intuition that with a few probes, it should be possible to discover enough alternative paths. Computer simulations were conducted to obtain the number of different paths being discovered versus the number of probes in various size topologies. The hash function used in the routers is salted CRC16, where each router uses a random salt to avoid correlation between different routers in traffic distribution. Note that this is used by the native ECMP to achieve load balancing, but is not a requirement of PROBE. In the ideal case, k probes should discover k different paths. In practice, the number of paths is most likely less than k. In our simulation, sequences of probes were performed to observe the number of paths being discovered. Such experiments were conducted multiple times to get the average numbers and worst numbers. FIG. 12 illustrates a graph 1200 which depicts the results of the probe for a small network with 5 rows and 4 stages. For 20 probes, more than 19 alternative paths were found on an average and 17 alternative paths were found in the worst case. FIG. 13 illustrates a graph 1300 which depicts the results of the probe for a large network with 20 rows and 6 stages. For 20 probes, 20 different alternative paths were found in all cases.

Further, while each probe may generate extra overhead traffic, it typically does not introduce impact to data center networks for several reasons. First, the probe is triggered only by big flows. According to traffic measurement (See, e.g., S. Kandula, S. Sengupta, A. Greenberg, P. Patel, and R. Chaiken, "The nature of Data Center Traffic: Measurements & Analysis," *Proceedings of the 9th ACM SIGCOMM Conference on Internet Measurement Conference, IMC '09*, pages 202-208, New York, N.Y., USA, (2009), incorporated herein by reference.), only a small fraction of flows (about 20%) are big flows; most flows are small flows. Second, the PROBE agents cache path information for later use. Thus, they do not probe the same destination frequently. Third, the probe packets are small, containing a 20-byte IP header and a 20-byte TCP header (or a 8-byte UDP header). So the total short-term peak rate bound of a probe is:

$$r = N*H*L/\Delta \quad (5)$$

where,

N is the number of parallel probe sessions,
H is the maximum hop count,
L is the length of a probe packet, and
$\Delta$ is the probe duration.

Further, when a physical computer is virtualized into multiple virtual machines, the overhead may be reduced by consolidating the probe operation. For example, the PROBE agent may be integrated with a hypervisor (one of many virtualization techniques which allow multiple operating systems to run concurrently on a host computer) so that all the virtual machines may share the same probe results.

4.6 Conclusion

As can be appreciated from the foregoing, exemplary embodiments consistent with the present invention provide methods and apparatus for balancing load in a network using flow based routing. Unlike the previously known methods, the exemplary methods do not require the nodes in the network (for example, a router or a switch) to be modified, or to store the flow tables. Also, since the exemplary methods do not introduce any changes to the routers in the network, they may be used with the existing routers and may be easily deployed in the existing data center networks to achieve effective load balancing. Further, simulation results and mathematical analysis of the proposed flow-based routing process using probe showed that the process discovers alternative paths effectively.

What is claimed is:

1. A computer-implemented method comprising:
    detecting, with a computer system including one or more computers in a network, a flow of packets;
    identifying the detected flow as a big flow, the big flow having packet header information identifying a source host and a destination host of the big flow;
    probing, with the computer system and responsive to detection of the big flow, the network by altering the packet header information to discover one or more alternative paths from the source host to the destination host in the network;
    generating, with the computer system and for each of the one or more alternative paths, an association of the packet header information to an alternative path discovered using results of probing the network, wherein the alternative path is identified by at least one of an alternative source port and an alternative destination port;
    determining if congestion exists on a path currently being used by the big flow in the network;
    selecting, with the computer system and responsive to a determination of the existence of congestion on the path currently being used, an alternative path that is from the one or more alternative paths and that is not congested;
    altering the packet header information of the big flow, with the computer system, by replacing at least one of a value of a source port number or a destination port number in the packet header information of the big flow with a least one of a value of the alternative source port or the alternative destination port using the generated association of the packet header information to the selected alternative path such that the big flow will be transmitted from the source host to the destination host using the selected alternative path; and
    replacing, upon receipt of the big flow at the destination host, the at least one of a value of the alternative source port number or the alternative destination port number in the altered packet header information with a value of corresponding fields of the original packet header information of the big flow.

2. The computer-implemented method of claim 1, wherein probing the network comprises:
    creating one or more probe packets, wherein each of the one or more probe packets has header information similar to the packet header information by
        (i) setting values of a source Internet Protocol (IP) address, a destination IP address, and a protocol field in the header information of each of the one or more probe packets to values of corresponding fields in the packet header information, and
        (ii) setting at least one of a source port number and a destination port number in the header information of each of the one or more probe packets to a port number that is different from the corresponding port number in the packet header information;
    setting values of a time-to-live field in each of the one or more probe packets such that the probe packets will be sent into the network at different points along an alternative path; and transmitting the one or more probe packets in the network.

3. The computer-implemented method of claim 2, further comprising:
receiving the result of each of the one or more probe packets, wherein the results collectively indicate a path taken by the one or more probe packets from the source host towards the destination host; and
reconstructing an alternative path from the source host to the destination host using the result of each of the one or more probe packets.

4. The computer-implemented method of claim 2, wherein the one or more probe packets are transmitted such that the one or more probe packets traverse multiple hops of the same alternative path and multiple alternative paths in parallel.

5. The computer-implemented method of claim 1, wherein each of the altered packet header information associated with each of the one or more alternative paths differs from the packet header information in at least one of a source port number and a destination port number.

6. The computer-implemented method of claim 1, wherein the flow has characteristics of a big flow when it lasts longer than a pre-determined duration threshold.

7. The computer-implemented method of claim 1, wherein the flow has characteristics of a big flow when it has a bit rate higher than a pre-determined rate threshold.

8. The computer-implemented method of claim 1, wherein the flow has characteristics of a big flow when it both lasts longer than a pre-determined duration threshold and has a bit rate higher than a pre-determined rate threshold.

9. The computer-implemented method of claim 1, wherein the packet header information includes a source Internet Protocol (IP) address field, a destination IP address field, a protocol field, a source port number field and a destination port number field.

10. The computer-implemented method of claim 1, wherein each of the one or more associations of the packet header information to an alternative path is generated by associating at least one of a source port number and a destination port number of the packet header information to at least one of a source port number and a destination port number corresponding to the alternative path.

11. The computer-implemented method of claim 1 further comprising:
transmitting the association of the packet header information to the selected alternative path to the destination host.

12. The computer-implemented method of claim 11 further comprising:
storing the association of the packet header information to the selected alternative path at the destination host.

13. The computer-implemented method of claim 12, wherein the association is stored as an association of at least one of a source port number and destination port number of the selected alternative path to at least one of a source port number and destination port number of the packet header information.

14. The computer-implemented method of claim 1, wherein replacing the at least one of the value of source port number or destination port number in the altered packet header information is performed using the association of at least one of a source port number and a destination port number of the selected alternative path to at least one of a source port number and destination port number of the packet header information stored at the destination host.

15. The computer-implemented method of claim 1, wherein the big flow is transmitted to the destination host using an equal cost multi path (ECMP) routing protocol.

16. The computer-implemented method of claim 1, wherein the act of selecting the alternative path is performed by the source host.

17. The computer-implemented method of claim 1, wherein the act of selecting the alternative path is performed by a controller in the network that monitors traffic in the network.

18. A computer-implemented method comprising:
detecting, with a computer system including one or more computers in a network, a flow of packets;
identifying the detected flow as a big flow, the big flow having packet header information identifying a source host and a destination host of the big flow;
probing, with the computer system and responsive to detection of the big flow, the network by altering the packet header information to discover one or more alternative paths from the source host to the destination host in the network;
generating, with the computer system and for each of the one or more alternative paths, an association of the packet header information to an alternative path discovered using results of probing the network, wherein the alternative path is identified by at least one of an alternative source port and an alternative destination port;
notifying, with the computer system, to a controller in the network that is monitoring traffic in the network, the big flow and the one or more alternative paths;
determining, with the controller, that congestion exists on a path currently being used by the big flow in the network;
selecting, with the controller and responsive to a determination of the existence of congestion on the path currently being used by the big flow, an alternative path from the one or more alternative paths that is not congested;
sending, with the controller, a re-route notification including a path identification of the selected alternative path to the source host;
altering the packet header information of the big flow, upon a receipt of the re-route notification, by replacing at least one of a value of a source port number or a destination port number in the packet header information of the big flow with a least one of a value of the alternative source port or the alternative destination port using the generated association such that the big flow will be transmitted from the source host to the destination host using the selected alternative path; and
replacing, upon receipt of the big flow at the destination host, the at least one of a value of the alternative source port number or the alternative destination port number in the altered packet header information with a value of corresponding fields of the original packet header information of the big flow.

19. Apparatus comprising:
a) at least one processor;
b) at least one input device; and
c) at least one storage device storing program instructions which, when executed by the at least one processor, performs a method including:
detecting, with a computer system including one or more computers in a network, a flow of packets,
identifying the detected flow as a big flow, the big flow having packet header information identifying a source host and a destination host of the big flow,
probing, with the computer system and responsive to detection of the big flow, the network by altering the packet header information to discover one or more alternative paths from the source host to the destination host in the network, generating, with the computer system and for each of the one or more alternative paths, an association of the packet header information to an alternative path discovered using results of probing the network, wherein the alternative path is identified by at least one of an alternative source port and an alternative destination port, determining if congestion exists on a path currently being used by the big flow in the network, selecting, with the computer system and responsive to a determination of the existence of congestion on the path currently being used by the big flow, an alternative path that is from the one or more alternative paths and that is not congested, altering the packet header information of the big flow, with the computer system, by replacing at least one of a value of a source port number or a destination port number in the packet header information of the big flow with a least one of a value of the alternative source port or the alternative destination port using the generated association of the packet header information to the selected alternative path such that the big flow will be transmitted from the source host to the destination host using the selected alternative path, and replacing, upon receipt of the big flow at the destination host, the at least one of a value of the alternative source port number or the alternative destination port number in the altered packet header information with a value of corresponding fields of the original packet header information of the big flow.

20. An article of manufacture comprising:

a non-transitory machine-readable medium having instructions which, when executed by a machine, performs a method including:

detecting, with a computer system including one or more computers in a network, a flow of packets, identifying the detected flow as a big flow, the big flow having packet header information identifying a source host and a destination host of the big flow, probing, with the computer system and responsive to detection of the big flow, the network by altering the packet header information to discover one or more alternative paths from the source host to the destination host in the network, generating, with the computer system and for each of the one or more alternative paths, an association of the packet header information to an alternative path discovered using results of probing the network, wherein the alternative path is identified by at least one of an alternative source port and an alternative destination port, determining if congestion exists on a path currently being used by the big flow in the network, selecting, with the computer system and responsive to a determination of the existence of congestion on the path currently being used by the big flow, an alternative path that is from the one or more alternative paths and that is not congested, altering the packet header information of the big flow, with the computer system, by replacing at least one of a value of a source port number or a destination port number in the packet header information of the big flow with a least one of a value of the alternative source port or the alternative destination port using the generated association of the packet header information to the selected alternative path such that the big flow will be transmitted from the source host to the destination host using the selected alternative path; and replacing, upon receipt of the big flow at the destination host, at least one of a value of the alternative source port number or the alternative destination port number in the altered packet header information with a value of corresponding fields of the original packet header information of the big flow.

* * * * *